(12) United States Patent
Ashikaga et al.

(10) Patent No.: US 10,151,254 B2
(45) Date of Patent: Dec. 11, 2018

(54) ENGINE SYSTEM WITH VALVE STOP

(71) Applicant: Mazda Motor Corporation, Aki-gun, Hiroshima (JP)

(72) Inventors: Kensuke Ashikaga, Hiroshima (JP); Masayoshi Higashio, Hiroshima (JP); Akira Tsuda, Hofu (JP); Yukio Haizaki, Hiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 107 days.

(21) Appl. No.: 15/300,495

(22) PCT Filed: Feb. 18, 2015

(86) PCT No.: PCT/JP2015/000770
§ 371 (c)(1),
(2) Date: Sep. 29, 2016

(87) PCT Pub. No.: WO2015/151390
PCT Pub. Date: Oct. 8, 2015

(65) Prior Publication Data
US 2017/0114729 A1 Apr. 27, 2017

(30) Foreign Application Priority Data
Mar. 31, 2014 (JP) ................. 2014-071621

(51) Int. Cl.
*F01L 1/24* (2006.01)
*F02D 13/06* (2006.01)
(Continued)

(52) U.S. Cl.
CPC ............ *F02D 13/06* (2013.01); *F01L 1/2405* (2013.01); *F01L 13/0005* (2013.01);
(Continued)

(58) Field of Classification Search
CPC ...... F02D 13/06; F02D 17/02; F02D 41/0087; F02D 2200/0406; F02D 2200/101;
(Continued)

(56) References Cited

U.S. PATENT DOCUMENTS 5,816,353 A * 10/1998 Matsuki ................. B60K 28/16
180/197
7,534,194 B2 * 5/2009 Eguchi .................... F16H 59/14
477/121

(Continued)

FOREIGN PATENT DOCUMENTS

| JP | 2000073792 A | 3/2000 |
| JP | 2004137969 A | 5/2004 |
| WO | 2012056535 A1 | 5/2012 |

OTHER PUBLICATIONS

ISA Japan Patent Office, International Search Report Issued in Application No. PCT/JP2015/000770, dated Mar. 24, 2015, WIPO, 4 pages.

(Continued)

*Primary Examiner* — David Hamaoui
(74) *Attorney, Agent, or Firm* — Alleman Hall Creasman & Tuttle LLP

(57) ABSTRACT

An engine system includes: a hydraulic valve stop mechanism configured to switch states of an intake valve and exhaust valve of a same stopped cylinder; a hydraulic pressure changing device configured to change hydraulic pressure supplied to the valve stop mechanism; and a valve control portion configured to control the hydraulic pressure changing device. When a return from a reduced-cylinder operation to an all-cylinder operation is requested, and an engine revolution is less than a reference revolution, the hydraulic pressure is changed such that opening of one of the valves of the stopped cylinder able to restart at an earlier stage is first restarted. When the return is requested, and the (Continued)

engine revolution is not less than the reference revolution, the hydraulic pressure is changed such that opening of the exhaust valve of the stopped cylinder is restarted before opening of the intake valve.

5 Claims, 12 Drawing Sheets

(51) Int. Cl.
    *F02D 41/00*      (2006.01)
    *F02D 17/02*      (2006.01)
    *F01L 13/00*      (2006.01)

(52) U.S. Cl.
    CPC .......... *F02D 17/02* (2013.01); *F02D 41/0087* (2013.01); *F01L 2013/001* (2013.01); *F01L 2800/00* (2013.01); *F01L 2800/08* (2013.01); *F01L 2800/11* (2013.01); *F02D 2041/0012* (2013.01); *F02D 2200/0406* (2013.01); *F02D 2200/101* (2013.01); *Y02T 10/18* (2013.01)

(58) Field of Classification Search
    CPC .......... F02D 2041/0012; F01L 13/0005; F01L 1/2405; F01L 2800/11; F01L 2800/08; F01L 2013/001; F01L 2800/00; Y02T 10/18
    See application file for complete search history.

(56) References Cited

U.S. PATENT DOCUMENTS

| | | | |
|---|---|---|---|
| 8,240,279 B2 * | 8/2012 | Wada | F01L 1/34 123/90.12 |
| 2013/0255606 A1 | 10/2013 | Nishikiori et al. | |
| 2017/0045001 A1 * | 2/2017 | Haizaki | F02D 13/02 |

OTHER PUBLICATIONS

IPEA Japan Patent Office, Translation of International Preliminary Report on Patentability Issued in Application No. PCT/JP2015/000770, dated Sep. 30, 2016, WIPO, 5 pages.

* cited by examiner

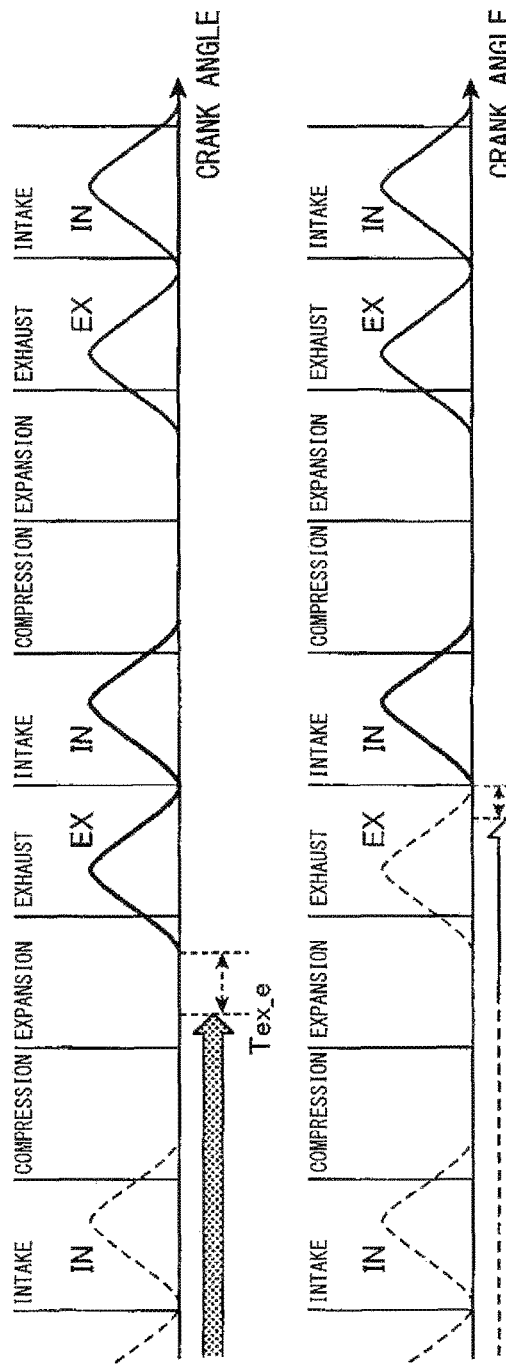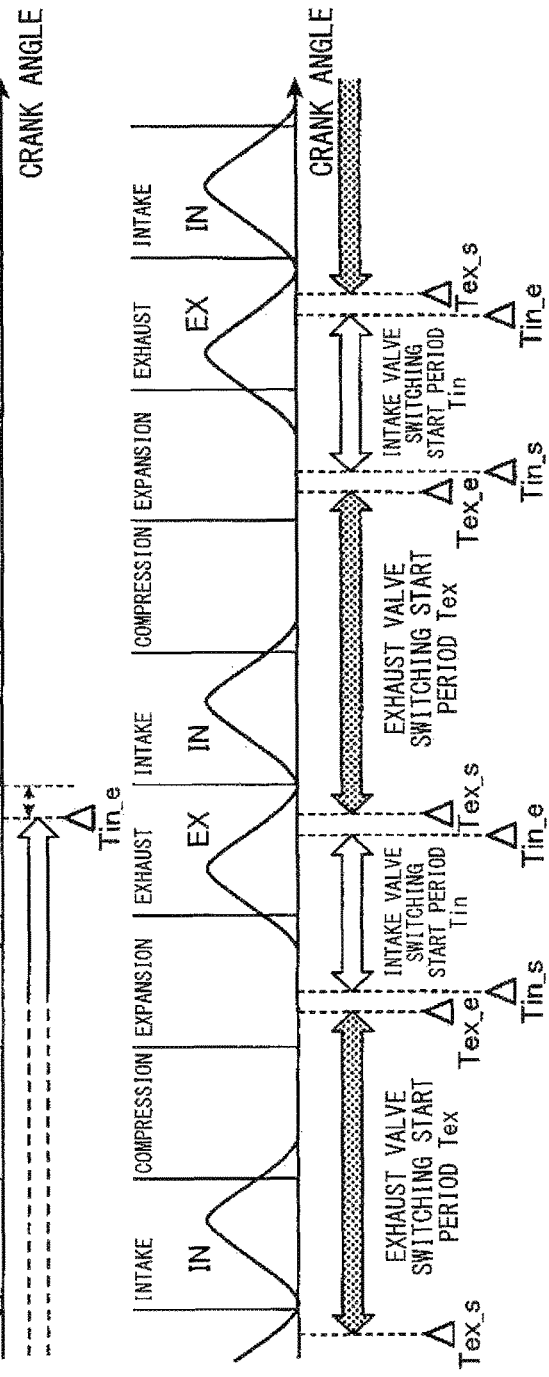
Fig. 6A
Fig. 6B
Fig. 6C

ENGINE SYSTEM WITH VALVE STOP

TECHNICAL FIELD

The present invention relates to an engine system including a plurality of cylinders each including an intake valve and an exhaust valve and each configured to combust an air-fuel mixture that is a mixture of air and a fuel.

BACKGROUND ART

For the purpose of improving a fuel efficiency and the like, an engine including a plurality of cylinders conventionally performs a reduced-cylinder operation in which: a part of the cylinders is set to a stop state where opening of an intake valve, opening of an exhaust valve, and combustion in the cylinder are stopped; and the engine is driven only by the remaining cylinders.

To return the operation of the engine from the reduced-cylinder operation to an all-cylinder operation in which all the cylinders are operated (the combustion is performed in each of all the cylinders), when the combustion in the stopped cylinder is restarted in a state where the exhaust valve of the stopped cylinder is not open, so-called backfire may occur at the time of the opening of the intake valve, that is, a high-temperature exhaust gas generated by the combustion may flow backward through an intake passage at the time of the opening of the intake valve. Therefore, it is preferable that whether or not the exhaust valve is actually open be determined when the operation of the engine is returned to the all-cylinder operation.

As a device that determines whether or not the exhaust valve is actually open, for example, PTL 1 discloses a device configured to: detect an increased amount of intake pressure increased when the intake valve is open; when the increased amount is large, determine that a close failure of the exhaust valve occurs, and the exhaust valve is not actually open. To be specific, when the close failure of the exhaust valve occurs, a high-pressure combustion gas is not discharged but remains in the cylinder. When the intake valve is open, the high-pressure gas flows backward to the intake passage, and the intake pressure increases. Therefore, when the increased amount is not less than a predetermined value, it is determined that the close failure of the exhaust valve occurs.

CITATION LIST

Patent Literature

PTL 1: Japanese Laid-Open Patent Application Publication No. 2000-73792

SUMMARY OF INVENTION

Technical Problem

It is thought that the occurrence of the backfire can be avoided in such a manner that: the device of PTL 1 is applied to the engine that performs the reduced-cylinder operation; whether or not the exhaust valve is normally open is determined when returning the operation of the engine from the reduced-cylinder operation to the all-cylinder operation; and only when it is determined that the exhaust valve is normally open, the combustion of the cylinder set to the stop state is restarted. However, the occurrence of the backfire when returning the operation of the engine from the reduced-cylinder operation to the all-cylinder operation may not be completely avoided only by simply applying the device of PTL 1 to the engine. Specifically, the engine that performs the reduced-cylinder operation is configured such that: the intake valve and exhaust valve of the cylinder set to the stop state are kept closed at the time of the reduced-cylinder operation; and when the operation of the engine is returned to the all-cylinder operation, each of the intake valve and the exhaust valve is returned to an openable/closable state. The restart of the intake valve may be delayed by, for example, an operation delay of a mechanism that switches states of the intake and exhaust valves. If the restart of the intake valve is delayed, the intake valve is not actually open, so that the increased amount of the intake pressure is detected as a small value, and it is determined that the exhaust valve is normally open. To be specific, regardless of the open/close state of the exhaust valve, it is determined that the exhaust valve is open. Therefore, if the exhaust valve is not open, the backfire may occur by the restart of the combustion.

The present invention was made in consideration of these circumstances, and an object of the present invention is to provide an engine system capable of improving safety by more surely avoiding an erroneous determination that an exhaust valve is open when returning an operation of the engine system from a reduced-cylinder operation to an all-cylinder operation.

Solution to Problem

In order to solve the above problems, the present invention provides an engine system including a plurality of cylinders each including an intake valve and an exhaust valve, an air-fuel mixture that is a mixture of air and a fuel being combusted in each of the plurality of cylinders, the engine system configured to switch between an all-cylinder operation in which the air-fuel mixture is combusted in each of all the cylinders and a reduced-cylinder operation in which the air-fuel mixture is not combusted in a specific cylinder out of the plurality of cylinders, and the specific cylinder is set to a stop state, the engine system further including: a hydraulic drive valve stop mechanism configured to perform switching between a state where each of the intake valve and exhaust valve of the specific cylinder is openable and closable and a state where each of the intake valve and exhaust valve of the specific cylinder is kept closed; a hydraulic pressure changing device configured to change hydraulic pressure supplied to the valve stop mechanism; a valve control portion configured to cause the valve stop mechanism to perform the switching by causing the hydraulic pressure changing device to change the hydraulic pressure; and an exhaust valve abnormality determining portion configured to, when returning from the reduced-cylinder operation to the all-cylinder operation is requested, determine based on intake pressure before and after an open start timing of the intake valve of the specific cylinder whether or not opening/closing operations of the exhaust valve of the specific cylinder are normally performed, wherein: the valve stop mechanism is configured to simultaneously switch the states of the intake valve and exhaust valve of the same cylinder; when switching from the all-cylinder operation to the reduced-cylinder operation is requested, the valve control portion causes the hydraulic pressure changing device to change the hydraulic pressure such that the switching to the state where the intake valve and exhaust valve of the specific cylinder are kept closed is performed by the valve stop mechanism; when the returning from the reduced-cylinder operation to the all-cylinder operation is requested, the valve control portion causes the hydraulic pressure changing device to change the hydraulic pressure such that the switching to the state where the intake valve and exhaust valve of the specific cylinder are openable and closable is performed by the valve stop mechanism; when the returning is requested, and an engine revolution is less than a preset reference revolution, the valve control portion causes the hydraulic pressure changing device to change the hydraulic pressure such that opening of a valve which is one of the intake valve and exhaust valve of the specific cylinder and is able to restart at an earlier stage is first restarted; and when the returning is requested, and the engine revolution is not less than the reference revolution, the valve control portion causes the hydraulic pressure changing device to change the hydraulic pressure such that the opening of the exhaust valve of the specific cylinder is restarted before the opening of the intake valve of the specific cylinder.

According to this engine system, when the valve stop mechanism that switches the states of the intake and exhaust valves is a hydraulic drive type and is configured to simultaneously switch the states of the intake and exhaust valves of the same cylinder, it is possible to more surely avoid an erroneous determination that the exhaust valve is normally opened, although the exhaust valve is not opened at the time of the returning from the reduced-cylinder operation to the all-cylinder operation due to, for example, a response delay of the hydraulic pressure supplied to the valve stop mechanism. Thus, the occurrence of the backfire due to this erroneous determination is avoided, and the safety can be further improved.

Specifically, according to the engine system, the valve stop mechanism is configured to simultaneously switch the states of the intake valve and exhaust valve of the same cylinder. Therefore, a period (crank angle) in which the opening of the intake valve can be restarted before the opening of the exhaust valve is shorter than a period (crank angle) in which the opening of the exhaust valve can be first restarted. Then, time lengths of these periods (crank angles) become shorter as the engine revolution increases. Therefore, when the engine revolution is high, the time length in which the opening of the intake valve can be first restarted becomes extremely short. Even when changing the hydraulic pressure supplied to the valve stop mechanism is started within this time length, the switching of the states of the intake and exhaust valves by the valve stop mechanism may not be completed within this period due to, for example, the operation delay of the hydraulic pressure, and first restarting the opening of the intake valve may be failed. If first restarting the opening of the intake valve is failed as above, it is erroneously recognized that the intake valve is open although it is not actually open. Then, if the state of the exhaust valve is determined based on this erroneous recognition, it may be erroneously determined that the exhaust valve is normally open although it is not open.

However, according to the present invention, as described above, when the engine revolution is less than the reference revolution, opening of a valve which is one of the intake valve and the exhaust valve and is able to restart at an earlier stage is first restarted. In contrast, when the engine revolution is not less than the reference revolution, and the time length in which the opening of the intake valve can be first restarted is short, the opening of the exhaust valve is first restarted. Therefore, the erroneous determination due to the failure of the restart of the intake valve in a high-rotation region can be avoided while improving the responsiveness, and the occurrence of the backfire due to the erroneous determination can be more surely avoided.

One example of a specific configuration of the present invention is that: the hydraulic pressure changing device is configured such that when the returning from the reduced-cylinder operation to the all-cylinder operation is requested, the hydraulic pressure changing device starts changing the hydraulic pressure in a preset first period, and as a result, the opening of the exhaust valve of the specific cylinder is restarted before the opening of the intake valve of the specific cylinder, and when the returning from the reduced-cylinder operation to the all-cylinder operation is requested, the hydraulic pressure changing device starts changing the hydraulic pressure in a preset second period, and as a result, the opening of the intake valve of the specific cylinder is restarted before the opening of the exhaust valve of the specific cylinder; when the engine revolution is less than the reference revolution, and the returning from the reduced-cylinder operation to the all-cylinder operation is requested in a period from an end timing of the second period until an end timing of the first period, the valve control portion causes the hydraulic pressure changing device to start changing the hydraulic pressure in the first period; when the engine revolution is less than the reference revolution, and the returning is requested in a period from the end timing of the first period until the end timing of the second period, the valve control portion causes the hydraulic pressure changing device to start changing the hydraulic pressure in the second period; and when the engine revolution is not less than the reference revolution, the valve control portion causes the hydraulic pressure changing device to start changing the hydraulic pressure in the second period.

According to this configuration, when the returning to the all-cylinder operation is requested in the period from the end timing of the second period set such that the opening of the intake valve is first restarted until the end timing of the first period set such that the opening of the exhaust valve is first restarted, changing the hydraulic pressure is started in the first period. When the returning to the all-cylinder operation is requested in the period from the end timing of the first period until the end timing of the second period, changing the hydraulic pressure is started in the second period. Therefore, the opening of the intake valve and the opening of the exhaust valve can be restarted in a requested order, and the erroneous recognition and erroneous determination regarding the open states of these valves can be more surely avoided.

It is preferable that: in the above configuration, only when the engine revolution is less than the reference revolution, and the returning from the reduced-cylinder operation to the all-cylinder operation is requested in a period from the end timing of the second period until a middle timing of the first period, the valve control portion cause the hydraulic pressure changing device to start changing the hydraulic pressure in the first period; and when the engine revolution is less than the reference revolution, and the returning is requested in a period other than the period from the end timing of the second period until the middle timing of the first period, the valve control portion cause the hydraulic pressure changing device to start changing the hydraulic pressure in the second period.

With this, even when the engine revolution is less than the reference revolution, changing the hydraulic pressure for first restarting the opening of the intake valve is started only in a first half of the second period set as such a period that the opening of the intake valve can be first restarted. Therefore, it is possible to more surely avoid an unexpected case where although changing the hydraulic pressure is started in the second period, first restarting the opening of the intake valve is not performed due to, for example, an unexpected delay of the hydraulic pressure. Thus, it is possible to more surely avoid the erroneous recognition and erroneous determination regarding the open states of the intake and exhaust valves.

Further, in the present invention, it is preferable that the exhaust valve abnormality determining portion perform the determination based on the intake pressure before and after the open start timing at which the intake valve of the specific cylinder opens for a second or subsequent time after the returning from the reduced-cylinder operation to the all-cylinder operation is requested.

With this, it is possible to more surely avoid the erroneous determination that the exhaust valve is normally opened, although the exhaust valve is not normally opened (the exhaust valve is kept closed). Thus, the safety can be further improved.

Specifically, in the reduced-cylinder operation, the gas in the cylinder in the stop state leaks toward a crank case in some cases. When the gas in the cylinder leaks as above, and therefore, the cylinder internal pressure is low, and even if the exhaust valve is kept closed, the intake pressure when the intake valve is opened for the first time after the returning from the reduced-cylinder operation to the all-cylinder operation becomes substantially equal to the intake pressure when the exhaust valve is normally opened. To be specific, when the cylinder internal pressure is high, and the exhaust gas is not discharged with the exhaust valve kept closed, the high-pressure gas flows backward to the intake side by opening the intake valve, and the intake pressure becomes high (the absolute value and fluctuation of the pressure become large). On the other hand, when the cylinder internal pressure is high, but the exhaust gas is discharged by opening the exhaust valve, the intake pressure becomes low (the absolute value and fluctuation of the pressure become small). However, when the cylinder internal pressure is low, and even if the exhaust valve is kept closed, the high-pressure gas does not flow backward to the intake side by opening the intake valve. Therefore, the intake pressure becomes low (the absolute value and fluctuation of the pressure become small). On this account, when the cylinder internal pressure decreases due to the leak of the gas in the cylinder as above, it may be erroneously determined that the exhaust valve is normally opened although it is kept closed.

However, according to the above configuration, after the intake air is newly introduced to the cylinder by the opening of the intake valve after the returning is requested, that is, after the cylinder internal pressure is increased by the introduction of the intake air, the above determination is performed. Thus, the intake pressure when the exhaust valve is kept closed and the intake pressure when the exhaust valve is normally opened can be made different from each other. Therefore, whether or not the exhaust valve is normally opened can be more properly determined based on the intake pressure.

Further, in the present invention, it is preferable that when the engine revolution is less than the reference revolution, but the returning is requested within a predetermined period, the valve control portion cause the hydraulic pressure changing device to change the hydraulic pressure such that the opening of the exhaust valve of the specific cylinder is restarted before the opening of the intake valve of the specific cylinder.

With this, even when the high-pressure gas remains in the cylinder since the elapsed time since the start of the reduced-cylinder operation is relatively short, and therefore, the leakage of the gas is small, the high-pressure gas can be prevented from flowing backward from the cylinder to the intake side. Thus, the safety can be further improved.

When the elapsed time since the start of the reduced-cylinder operation is relatively short, and the high-pressure gas remains in the cylinder, the pressure at the open start timing of the intake valve differs depending on the open/close state of the exhaust valve without increasing the cylinder internal pressure by introducing the intake air into the cylinder by the opening of the intake valve. Therefore, in this case, even when the opening of the exhaust valve is first restarted, and the opening of the intake valve is then restarted, the open/close state of the exhaust valve can be properly determined by the intake pressure at the open start timing at which the intake valve opens for the first time.

It is preferable that: in the above configuration, when the returning from the reduced-cylinder operation to the all-cylinder operation is requested within a predetermined period from a start of the reduced-cylinder operation, the exhaust valve abnormality determining portion perform the determination based on the intake pressure before and after the open start timing at which the intake valve of the specific cylinder opens for a first or subsequent time after the returning is requested; and when the returning is requested after the predetermined period from the start of the reduced-cylinder operation, the exhaust valve abnormality determining portion perform the determination based on the intake pressure before and after the open start timing at which the intake valve of the specific cylinder opens for a second or subsequent time after the returning is requested.

With this, it is possible to more surely reduce opportunities of first restarting the opening of the intake valve, which restart may be failed. Thus, the open/close state of the exhaust valve can be properly determined.

Advantageous Effects of Invention

As explained above, according to the present invention, the safety of the engine system can be improved by more surely avoiding the erroneous determination that the exhaust valve is open when returning the operation of the engine system from the reduced-cylinder operation to the all-cylinder operation.

BRIEF DESCRIPTION OF DRAWINGS

FIG. 6A is a diagram for explaining a hydraulic pressure change start timing when restarting opening of an exhaust valve. FIG. 6B is a diagram for explaining the hydraulic pressure change start timing when restarting opening of an intake valve. FIG. 6C is a diagram for explaining the hydraulic pressure change start timing when restarting opening of the intake and exhaust valves.

DESCRIPTION OF EMBODIMENTS (1) Entire Configuration of Engine

Figure 1:
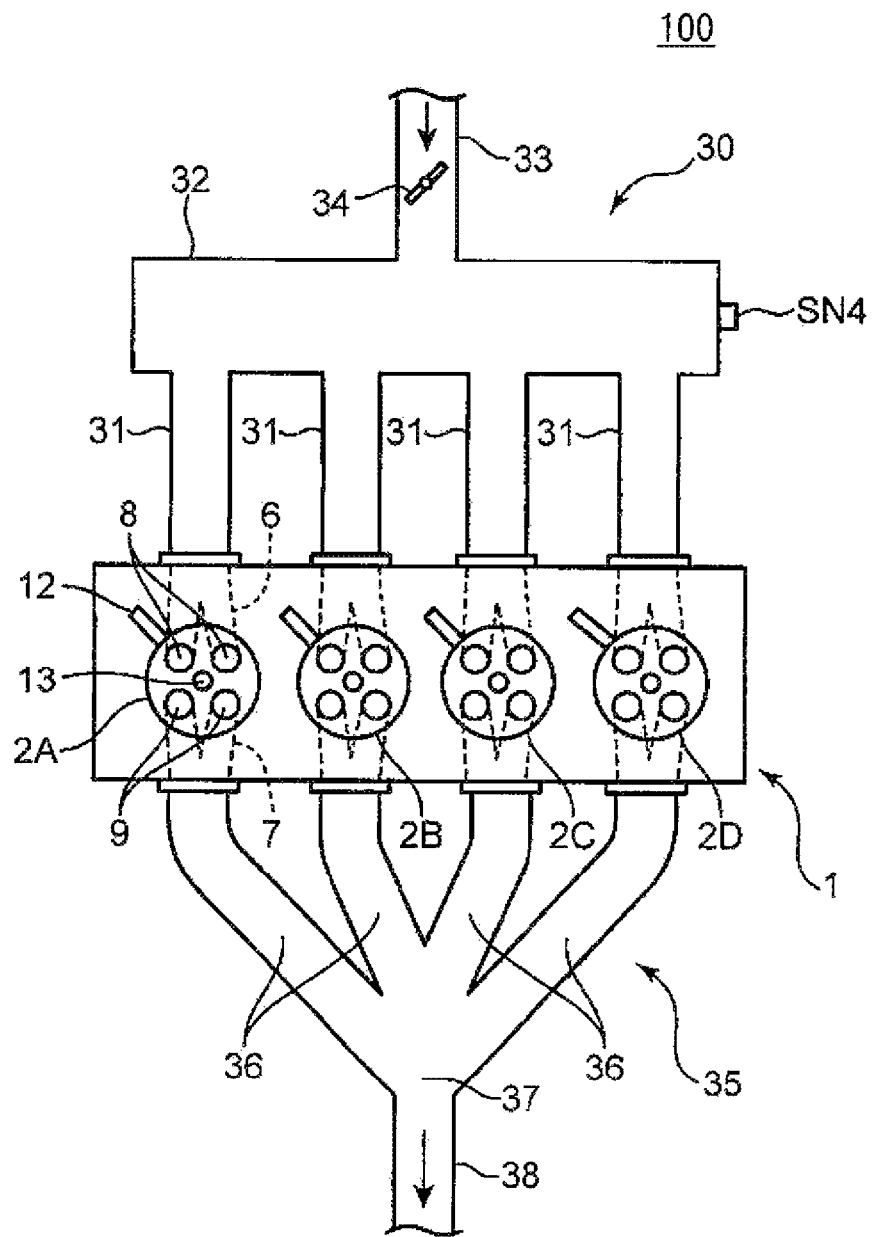
FIG. 1 is a diagram showing one embodiment of an engine system of the present invention.
Figure 2:
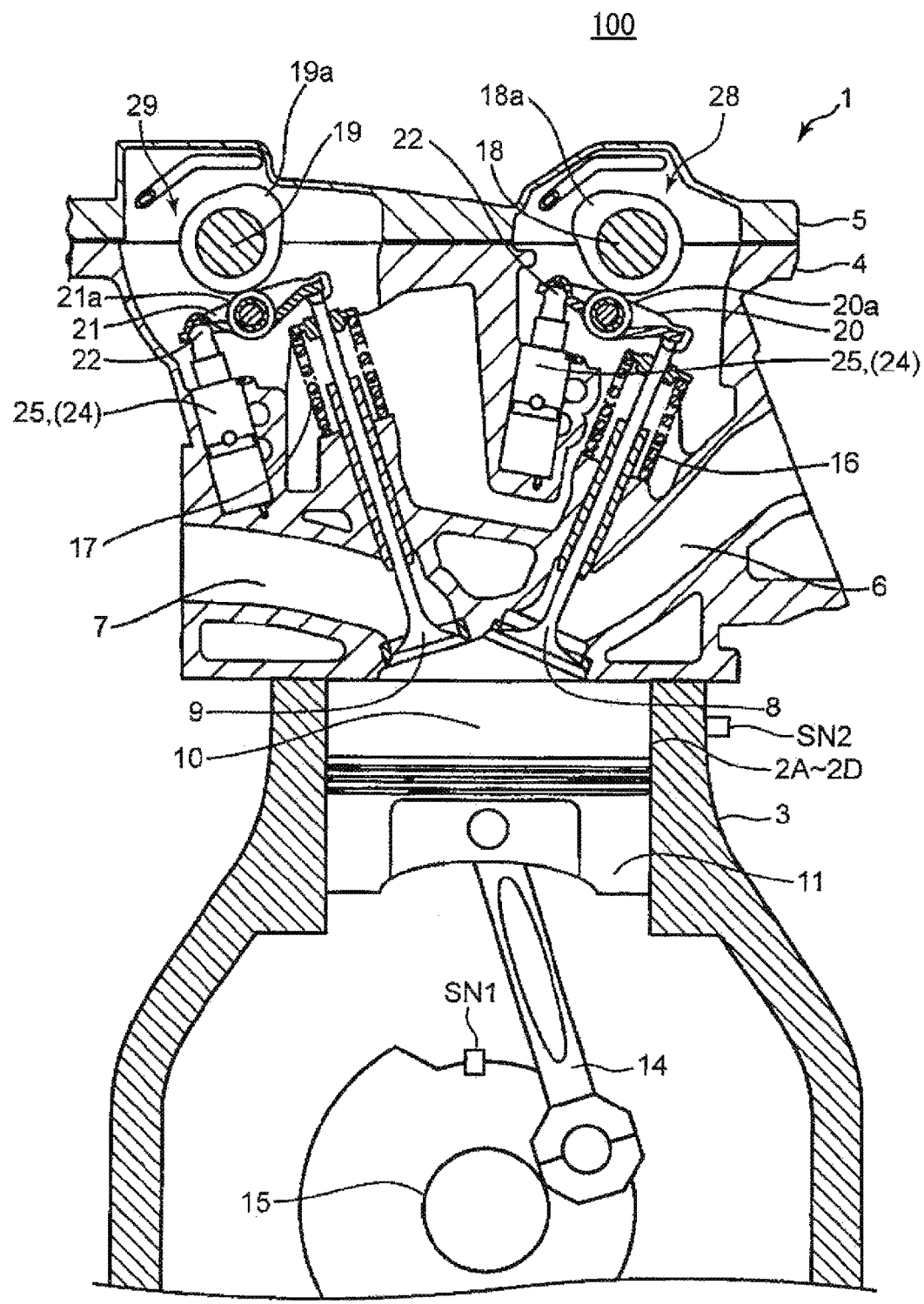
FIG. 2 is a schematic cross-sectional view of the engine system shown in FIG. 1.

FIGS. 1 and 2 are diagrams each showing one embodiment of an engine system 100 of the present invention. The engine shown in FIGS. 1 and 2 is a four stroke multicylinder gasoline engine mounted on a vehicle as a power source for traveling. Specifically, as shown in FIG. 1, the engine system 100 includes: an inline four cylinder engine main body 1 including four cylinders 2A to 2D linearly lined up; an intake passage 30 through which air is introduced to the engine main body 1; and an exhaust passage 35 through which an exhaust gas generated by the engine main body 1 is discharged.

As shown in FIG. 2, the engine main body 1 includes: a cylinder block 3 in which the four cylinders 2A to 2D are formed; a cylinder head 4 provided at an upper portion of the cylinder block 3; a cam cap 5 provided at an upper portion of the cylinder head 4; and pistons 11 inserted into the respective cylinders 2A to 2D so as to be able to reciprocate and slide.

Combustion chambers 10 are formed above the respective pistons 11. Fuel (fuel containing gasoline as a major component) ejected from below-described injectors 12 (see FIG. 1) is supplied to the respective combustion chambers 10. The supplied fuel is combusted in the combustion chambers 10. The pistons 11 pushed downward by expansion force of the combustion reciprocate in an upward/downward direction.

The pistons 11 are connected through connecting rods 14 to a crank shaft 15 that is an output shaft of the engine main body 1. The crank shaft 15 rotates around a central axis in accordance with reciprocating movements of the pistons 11.

The injectors 12 and spark plugs 13 (see FIG. 1) are provided at the cylinder head 4. The injectors 12 inject the fuel (gasoline) toward the respective combustion chambers 10 of the cylinders 2A to 2D. The spark plugs 13 supply ignition energy by spark discharge to an air-fuel mixture to combust the air-fuel mixture. The air-fuel mixture is a mixture of air and the fuel injected from the injectors 12. In the present embodiment, one injector 12 is provided for one cylinder, so that four injectors 12 are provided in total. Similarly, one spark plug 13 is provided for one cylinder, so that four spark plugs 13 are provided in total.

According to a four stroke four cylinder gasoline engine as in the present embodiment, the pistons 11 provided at the respective cylinders 2A to 2D vertically move with a phase difference of 180° in crank angle (180° C.A). In accordance with this, ignition timings, that is, combustion timings at the respective cylinders 2A to 2D are set to be different in phase by 180° C.A from one another. Specifically, the cylinders 2A, 2B, 2C, and 2D are referred to as first, second, third, and fourth cylinders, respectively from a left side in FIG. 1. The fuel is injected from the injectors 12 in order of the first cylinder 2A, the third cylinder 2C, the fourth cylinder 2D, and the second cylinder 2B. Then, the spark plugs 13 ignite the air-fuel mixture, and the combustion of the air-fuel mixture is performed in the above order.

The engine of the present embodiment is a variable cylinder engine capable of performing a reduced-cylinder operation that is an operation in which two out of the four cylinders 2A to 2D are stopped, and the remaining two cylinders are operated. Therefore, the above combustion order (ignition order) is performed in a normal operation (i.e., an all-cylinder operation in which all the four cylinders 2A to 2D are operated) that is not the reduced-cylinder operation. In contrast, in the reduced-cylinder operation, the fuel injection by the injector 12 and the ignition operation by the spark plug 13 are inhibited in each of two cylinders (specific cylinders; in the present embodiment, the first cylinder 2A and the fourth cylinder 2D) that are not consecutive in terms of the combustion order (ignition order). Therefore, the combustion is performed in every other cylinder. Hereinafter, the cylinder in which the ignition operation is inhibited in the reduced-cylinder operation may be referred to as a stopped cylinder.

Intake ports 6, exhaust ports 7, intake valves 8, and exhaust valves 9 are provided at the cylinder head 4. The air (intake air) supplied from the intake passage 30 is introduced through the intake ports 6 to the combustion chambers 10 of the cylinders 2A to 2D. The exhaust gas generated in the combustion chambers 10 of the cylinders 2A to 2D is introduced through the exhaust ports 7 to the exhaust passage 35. The intake valves 8 open and close openings, located close to the combustion chambers 10, of the intake ports 6 to control the supply of the intake air through the intake ports 6. The exhaust valves 9 open and close openings, located close to the combustion chambers 10, of the exhaust ports 7 to control the discharge of the gas through the exhaust ports 7. In the present embodiment, two intake valves 8 are provided for one cylinder, so that eight intake valves 8 are provided in total. Similarly, two exhaust valves 9 are provided for one cylinder, so that eight exhaust valves 8 are provided in total.

The intake passage 30 includes: four independent intake passages 31 communicating with the respective intake ports 6 of the cylinders 2A to 2D; a surge tank 32 connected to upstream end portions (end portions located at an upstream side in an intake air flow direction) of the independent intake passages 31; and one intake pipe 33 extending from the surge tank 32 toward the upstream side. A throttle valve 34 is disposed on a portion of the intake pipe 33. The throttle valve 34 is openable and closable and adjusts the flow rate of intake air introduced to the engine main body 1.

The exhaust passage 35 includes: four independent exhaust passages 36 communicating with the respective exhaust ports 7 of the cylinders 2A to 2D; a collecting portion 37 at which downstream end portions (end portions located at a downstream side in an exhaust gas flow direction) of the independent exhaust passages 36 are collected;

and one exhaust pipe 38 extending from the collecting portion 37 toward the downstream side.

(2) Valve Drive Mechanism

Figure 3:
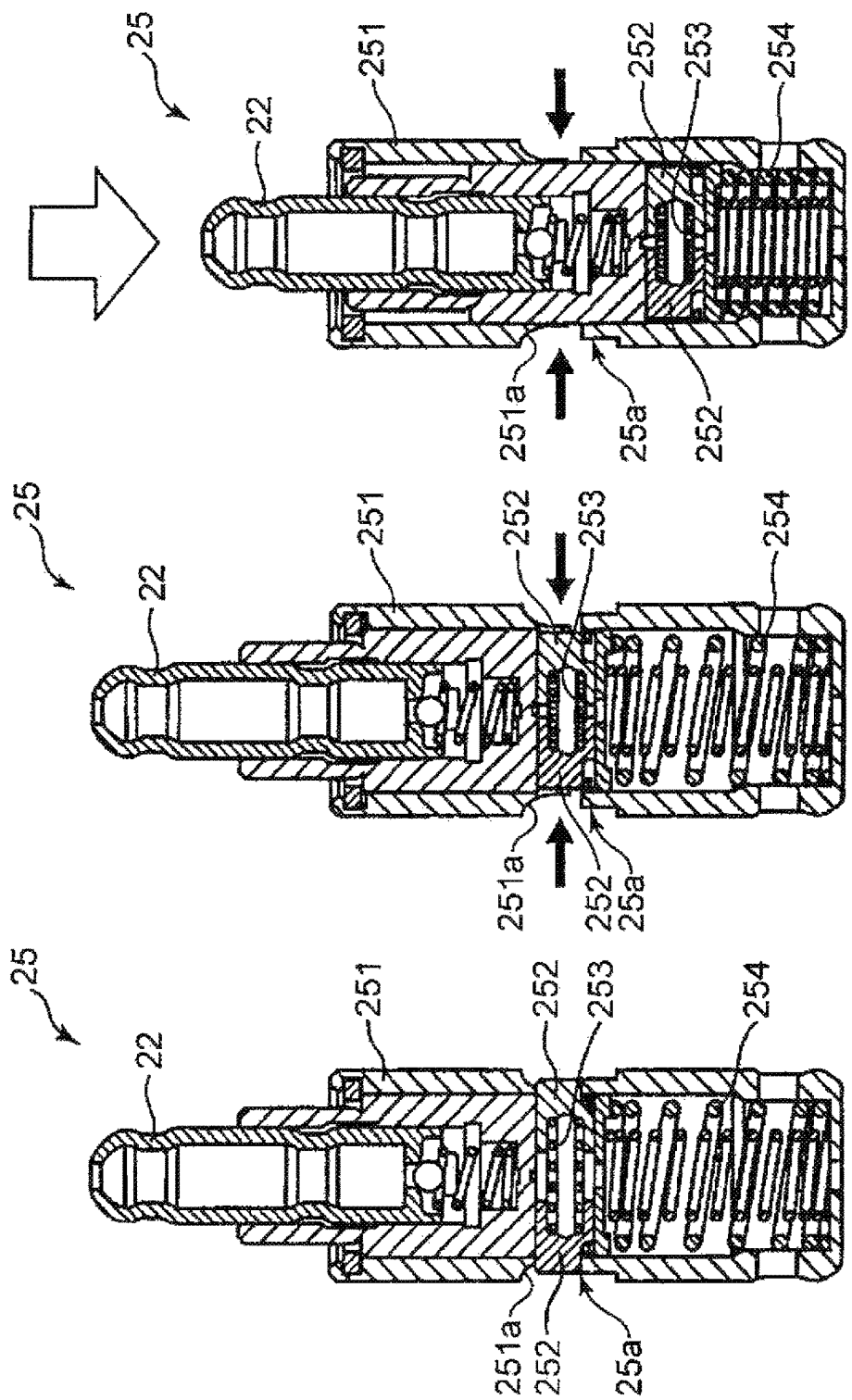
FIG. 3A is a diagram showing a valve stop mechanism when a pivot portion is in a locked state.
FIG. 3B is a diagram showing the valve stop mechanism before the pivot portion shifts to an unlocked state.
FIG. 3C is a diagram showing the valve stop mechanism when the pivot portion is in the unlocked state.

Next, mechanisms for opening and closing the intake valve 8 and the exhaust valve 9 will be explained in detail in reference to FIGS. 2, 3, and 4. A pair of valve drive mechanisms 28 and 29 (FIG. 2) provided at the cylinder head 4 open and close the intake valve 8 and the exhaust valve 9, respectively, in conjunction with the rotation of the crank shaft 15.

The valve drive mechanism 28 for the intake valve 8 includes: a return spring 16 configured to bias the intake valve 8 in a closing direction (upward direction in FIG. 2); a camshaft 18 configured to rotate in conjunction with the rotation of the crank shaft 15; a cam portion 18a provided so as to rotate integrally with the camshaft 18; a swing arm 20 periodically pressed by the cam portion 18a; and a pivot portion 22 serving as a swing fulcrum of the swing arm 20.

Similarly, the valve drive mechanism 29 for the exhaust valve 9 includes: a return spring 17 configured to bias the exhaust valve 9 in the closing direction (upward direction in FIG. 2); a camshaft 19 configured to rotate in conjunction with the rotation of the crank shaft 15; a cam portion 19a provided so as to rotate integrally with the camshaft 19; a swing arm 21 periodically pressed by the cam portion 19a; and a pivot portion 22 serving as a swing fulcrum of the swing arm 20.

The intake valve 8 and the exhaust valve 9 are opened and closed by the valve drive mechanisms 28 and 29 in the following manner. To be specific, when the camshaft 18 (19) rotates in accordance with the rotation of the crank shaft 15, a cam follower 20a (21a) rotatably provided at a substantially middle portion of the swing arm 20 (21) is periodically pressed downward by the cam portion 18a (19a), and the swing arm 20 (21) swings and is displaced using as a fulcrum the pivot portion 22 supporting one end portion of the swing arm 20 (21). In accordance with this, the other end portion of the swing arm 20 (21) presses the intake valve 8 (exhaust valve 9) downward against biasing force of the return spring 16 (17). Thus, the intake valve 8 (exhaust valve 9) is opened. As the pressing force of the cam portion 18a (19a) decreases, the opened intake valve 8 (opened exhaust valve 9) is again returned to a valve-closed position by the biasing force of the return spring 16 (17).

The pivot portion 22 is supported by a publicly known hydraulic lash adjuster 24 or 25 (hereinafter abbreviated as an "HLA") configured to automatically adjust a valve clearance to zero. The HLA 24 automatically adjusts the valve clearance of the second or third cylinder 2B or 2C located at a middle in a cylinder column direction. The HLA 25 automatically adjusts the valve clearance of the first or fourth cylinder 2A or 2D located at an end in the cylinder column direction.

The HLA 25 for the first cylinder 2A or the fourth cylinder 2D has a function of determining whether to allow or restrict the opening/closing operations of the intake or exhaust valve 8 or 9 in accordance with whether the operation of the engine is the reduced-cylinder operation or the all-cylinder operation. To be specific, in the all-cylinder operation of the engine, the HLAs 25 allow the opening/closing operations of the intake and exhaust valves 8 and 9 of the first and fourth cylinders 2A and 2D that are the stopped cylinders. On the other hand, in the reduced-cylinder operation of the engine, the HLAs 25 restrict the opening/closing operations of the intake and exhaust valves 8 and 9 of the first and fourth cylinders 2A and 2D that are the stopped cylinders, and the intake and exhaust valves 8 and 9 are kept closed. The HLA 25 includes a valve stop mechanism 25a shown in FIG. 3 as a mechanism configured to restrict the opening/closing operations of the intake or exhaust valve 8 or 9. On the other hand, the HLA 24 for the second cylinder 2B or the third cylinder 2C does not include the valve stop mechanism 25a and always allows the opening/closing operations of the intake or exhaust valve 8 or 9. Hereinafter, to distinguish the HLAs 24 and 25, the HLA 25 including the valve stop mechanism 25a is especially referred to as a S-HLA 25 (abbreviation of Switchable-Hydraulic Lash Adjuster).

The valve stop mechanism 25a of the S-HLA 25 includes: a bottomed outer tube 251 accommodating the pivot portion 22 such that the pivot portion 22 is slidable in an axial direction; a pair of lock pins 252 configured to be able to get in and out of two opposing through holes 251a formed on a peripheral surface of the outer tube 251 and also able to switch the pivot portion 22 between a locked state and an unlocked state; a lock spring 253 configured to bias the lock pins 252 in a radially outward direction; and a lost motion spring 254 provided between an inner bottom portion of the outer tube 251 and a bottom portion of the pivot portion 22 and configured to press and bias the pivot portion 22 upward relative to the outer tube 251.

As shown in FIG. 3A, when the lock pins 252 are fitted in the through holes 251a of the outer tube 251, the pivot portion 22 becomes the locked state, that is, the pivot portion 22 projects upward to be fixed. In this locked state, as shown in FIG. 2 and as described above, a top portion of the pivot portion 22 serves as the swing fulcrum of the swing arm 20 (21), and when the cam portion 18a (19a) presses the cam follower 20a (21a) downward by the rotation of the camshaft 18 (19), the intake valve 8 (exhaust valve 9) is displaced downward against the biasing force of the return spring 16 (17) to be opened. Therefore, in the all-cylinder operation in which all the four cylinders 2A to 2D are operated, the valve stop mechanisms 25a set the pivot portions 22 to the locked state to allow the opening/closing operations of the intake and exhaust valves 8 and 9 of the first and fourth cylinders 2A and 2D.

On the other hand, when the pair of lock pins 252 move in a radially inward direction to be positioned at an inner side between the through holes 251a, as shown in FIG. 3B, the pair of lock pins 252 move in a direction (radially inward direction of the outer tube 251) so as to get close to each other against tractive force of the lock spring 253. With this, the fitting between the lock pin 252 and the through hole 251a of the outer tube 251 is canceled, and the pivot portion 22 becomes the unlocked state, that is, the pivot portion 22 can move in the axial direction.

In the unlocked state, the pivot portion 22 is pressed downward against the biasing force of the lost motion spring 254, and thus a valve stopped state shown in FIG. 3C is realized. To be specific, the biasing force of the return spring 16 (17) configured to bias the intake valve 8 (exhaust valve 9) upward is higher than the biasing force of the lost motion spring 254 configured to bias the pivot portion 22 upward. Therefore, in the unlocked state, when the cam portion 18a (19a) presses the cam follower 20a (21a) downward in accordance with the rotation of the camshaft 18 (19), the top portion of the intake valve 8 (exhaust valve 9) serves as the swing fulcrum of the swing arm 20 (21), and the pivot portion 22 is displaced downward against the biasing force of the lost motion spring 254. Thus, the intake valve 8 (exhaust valve 9) is not displaced. To be specific, the intake valve 8 (exhaust valve 9) is kept closed. Therefore, in the reduced-cylinder operation in which the first and fourth cylinders 2A and 2D are stopped, the valve stop mechanisms 25a supply operating oil pressure to the lock pins 252 to set the pivot portions 22 to the unlocked state. With this, the opening/closing operations of the intake and exhaust valves 8 and 9 of the first and fourth cylinders 2A and 2D are restricted, and the intake and exhaust valves 8 and 9 are kept closed.

The valve stop mechanism 25a is a hydraulic drive type. The valve stop mechanism 25a, more specifically, the lock pin 252 of the valve stop mechanism 25a is driven by hydraulic pressure. The lock pin 252 gets in and out of the through hole 251a in accordance with the supplied hydraulic pressure. As shown in FIG. 4, operating oil is supplied from an oil pump 41 to the valve stop mechanisms 25a. A solenoid valve 42 (hydraulic pressure changing device) is provided between the oil pump 41 and the valve stop mechanism 25a. The solenoid valve 42 changes the hydraulic pressure supplied from the oil pump 41 to the valve stop mechanism 25a.

Figure 4:
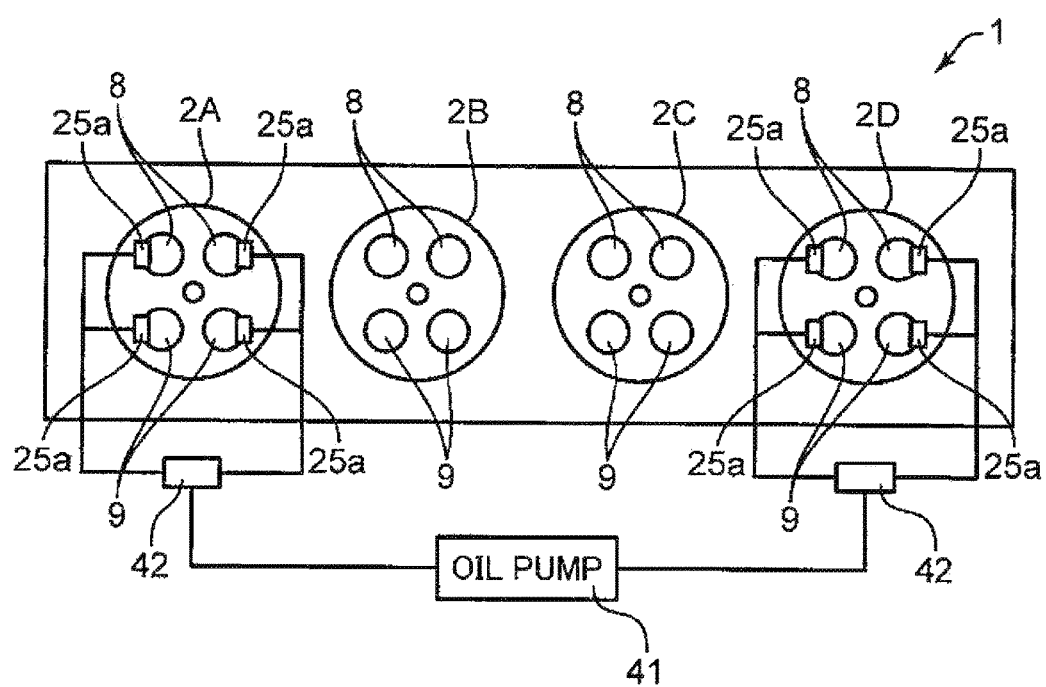
FIG. 4 is a diagram showing a route of operating oil of the valve stop mechanism.

As shown in FIG. 4, in the present embodiment, one solenoid valve 42 is provided for one cylinder, so that two solenoid valves 42 are provided in total. One of the solenoid valves 42 simultaneously changes the hydraulic pressure supplied to the valve stop mechanisms 25a provided at the intake valves 8 of the first cylinder 2A and the hydraulic pressure supplied to the valve stop mechanisms 25a provided at the exhaust valves 9 of the first cylinder 2A, and the other solenoid valve 42 simultaneously changes the hydraulic pressure supplied to the valve stop mechanisms 25a provided at the intake valves 8 of the fourth cylinder 2D and the hydraulic pressure supplied to the valve stop mechanisms 25a provided at the exhaust valves 9 of the fourth cylinder 2D.

According to this configuration, when restarting the opening of the intake and exhaust valves 8 and 9 of the stopped cylinder from a state where the intake and exhaust valves 8 and 9 are kept closed, each of a period in which the opening of the intake valve 8 of the stopped cylinder can be restarted before the opening of the exhaust valve 9 and a period in which the opening of the exhaust valve 9 of the stopped cylinder can be restarted before the opening of the intake valve 8 is limited to a relatively narrow range. Especially, the period in which the opening of the intake valve 8 of the stopped cylinder can be restarted before the opening of the exhaust valve 9 is limited to a narrower range.

Specific explanations will be made in reference to FIGS. 6A to 6C. In FIGS. 6A to 6C, "IN" denotes the intake valve 8, and "EX" denotes the exhaust valve.

FIG. 6A is a diagram showing a case where the opening of the exhaust valve 9 of the stopped cylinder is restarted. In a period from when the solenoid valve 42 starts changing the hydraulic pressure until when the movement of the pivot portion 22 of the valve stop mechanism 25a is completed, and the intake and exhaust valves 8 and 9 are switched to an openable/closable state, delays such as an operation delay of the hydraulic pressure and a movement delay of the pivot portion 22 occur. Therefore, as shown in FIG. 6A, to open the exhaust valve 9 at a valve open timing (open start timing), it is necessary to start driving the solenoid valve 42 before a timing Tex_e obtained by going back from the valve open timing of the exhaust valve 9 by the above delay and cause the solenoid valve 42 to start changing the hydraulic pressure supplied to the valve stop mechanism 25a.

FIG. 6B is a diagram showing a case where the opening of the intake valve 8 of the stopped cylinder is restarted. As shown in FIG. 6B, to open the intake valve 8 at a valve open timing (open start timing), it is necessary to start driving the solenoid valve 42 before a timing Tin_e obtained by going back from the valve open timing of the intake valve 8 by the above delay and cause the solenoid valve 42 to start changing the hydraulic pressure supplied to the valve stop mechanism 25a.

As described above, in the present embodiment, the hydraulic pressure supplied to the valve stop mechanism 25a for the intake valve 8 and the hydraulic pressure supplied to the valve stop mechanism 25a for the exhaust valve 9 are changed by the same solenoid valve 42. Therefore, for example, in FIG. 6B, if the driving of the solenoid valve 42 is started before the timing Tex_e according to the restart of the exhaust valve 9, the exhaust valve 9 is opened before the intake valve 8 is opened.

Therefore, in the present embodiment, an exhaust valve switching start period (first period) Tex that is a period in which the opening of the exhaust valve 9 of the stopped cylinder can be restarted before the opening of the intake valve 8 and an intake valve switching start period (second period) Tin that is a period in which the opening of the intake valve 8 of the stopped cylinder can be restarted before the opening of the exhaust valve 9 are specified as shown in FIG. 6C.

Specifically, in the present embodiment, the exhaust valve switching start period Tex is set to a range from a timing at a slightly advance side of an exhaust top dead center until a timing at a slightly delay side of a compression top dead center. Further, the intake valve switching start period Tin is set to a range from a timing at substantially a middle of an expansion stroke until a timing at a slightly delay side of a middle of an exhaust stroke and is a range smaller than the exhaust valve switching start period Tex.

Each of a period between an end timing Tex_e of the exhaust valve switching start period Tex and a start timing Tin_s of the intake valve switching start period Tin and a period between an end timing Tin_e of the intake valve switching start period Tin and a start timing Tex_s of the exhaust valve switching start period Tex is a gray zone in which it is unclear that which of the intake valve 8 and the exhaust valve 9 first restarts the opening. To be specific, if the driving of the solenoid valve 42 is started in the gray zone, the intake valve 8 may first restart the opening or the exhaust valve 9 may first restart the opening depending on the property and temperature of the operating oil and the amount of air in the operating oil (i.e., the degree of so-called air entrainment).

In other words, each of the exhaust valve switching start period Tex and the intake valve switching start period Tin is a value set as a period obtained by subtracting a variation of the operation delay of the valve stop mechanism 25a due to variations of the property and temperature of the operating oil and the amount of air in the operating oil from a period in which the exhaust valve or the intake valve can be basically opened while ignoring these variations, that is, as a period in which the opening of the exhaust valve 9 or the opening of the intake valve 8 can be actually first restarted.

Figure 10:
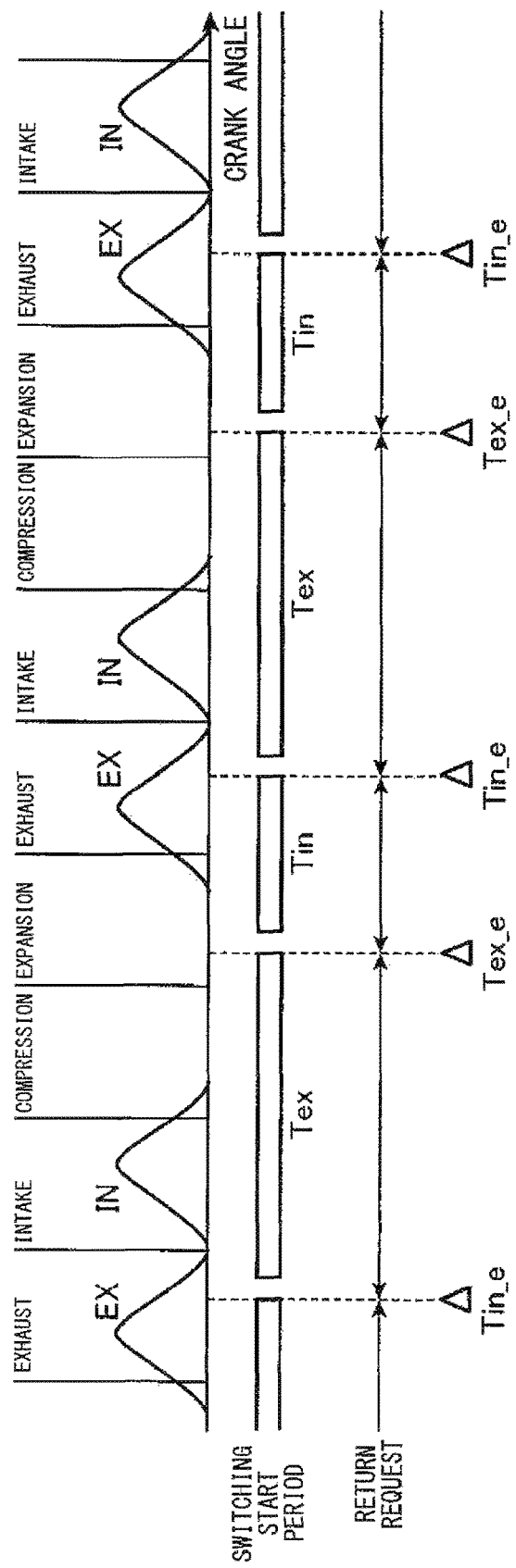
FIG. 10 is a diagram showing a relation between a timing at which returning is requested and the hydraulic pressure change start timing.

As described below, when the engine revolution is less than a reference revolution, and a time elapsed since the start of the reduced-cylinder operation exceeds a predetermined time, a hydraulic pressure change start timing of the solenoid valve 42 is determined in accordance with a timing at which returning from the reduced-cylinder operation to the all-cylinder operation is requested. In this case, when the returning is requested in the gray zone, the solenoid valve 42 waits for the start of the subsequent switching start period and starts changing the hydraulic pressure in this period. To be specific, as shown in FIG. 10, when the returning is requested in the period between the end timing Tex_e of the exhaust valve switching start period Tex and the start timing Tin_s of the intake valve switching start period Tin, the solenoid valve 42 waits for the start timing Tin_s of the intake valve switching start period Tin and starts changing the hydraulic pressure in the intake valve switching start period Tin. When the returning is requested in the period between the end timing Tin_e of the intake valve switching start period Tin and the start timing Tex_s of the exhaust valve switching start period Tex, the solenoid valve 42 waits for the start timing Tex_s of the exhaust valve switching start period Tex and starts changing the hydraulic pressure in the exhaust valve switching start period Tex.

(3) Control System

Figure 5:
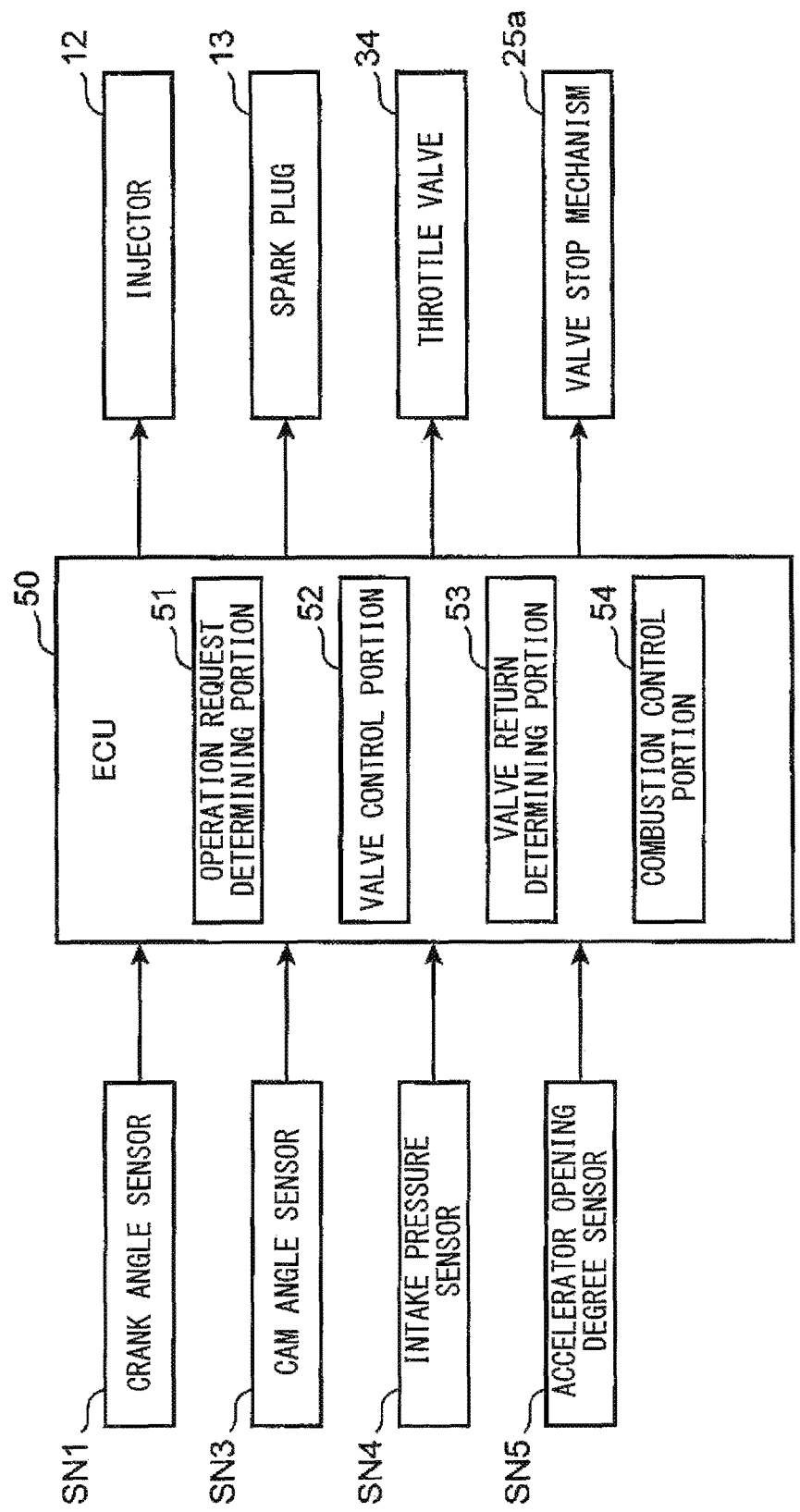
FIG. 5 is a diagram showing a control system of an engine shown in FIG. 1.

Next, a control system of the engine system 100 will be explained. Respective portions of the engine of the present embodiment are entirely controlled by an ECU (engine control unit; control means) 50 shown in FIG. 5. As is well known, the ECU 50 is a microprocessor constituted by a CPU, a ROM, a RAM, and the like.

Each of the engine and the vehicle is provided with a plurality of sensors that detect state quantities of respective portions of each of the engine and the vehicle. Information pieces from the sensors are input to the ECU 50.

For example, a crank angle sensor SN1 configured to detect a rotation angle and rotating speed of the crank shaft 15 is provided at the cylinder block 3. The crank angle sensor SN1 outputs a pulse signal in accordance with the rotation of a crank plate (not shown) that rotates integrally with the crank shaft 15, and the rotation angle (crank angle) and rotating speed of the crank shaft 15 are specified based on this pulse signal. Hereinafter, the rotating speed of the crank shaft 15 is referred to as an "engine revolution."

A cam angle sensor SN3 is provided at the cylinder head 4. The cam angle sensor SN3 outputs a pulse signal in accordance with passing of a tooth of a signal plate that rotates integrally with the camshaft (18 or 19). A cylinder determination information piece regarding which cylinder is in what stroke is specified based on the pulse signal from the crank angle sensor SN1 and the pulse signal from the cam angle sensor SN3.

An intake pressure sensor SN4 configured to detect the pressure of the intake air introduced into the cylinders 2A to 2D of the engine main body 1 is provided at the surge tank 32 of the intake passage 30.

An accelerator opening degree sensor SN5 configured to detect an opening degree (accelerator opening degree) of an accelerator pedal (not shown) operated by a driver is provided at the vehicle.

The ECU (control means) 50 is electrically connected to the sensors SN1 to SN5 and obtains the above various information pieces (such as the crank angle, the engine rotating speed, a vibration intensity, the cylinder determination information piece, and the accelerator opening degree) based on signals input from the sensors.

The ECU 50 controls the respective portions of the engine while executing various determinations, calculations, and the like based on the signals input from the sensors SN1 to SN5. To be specific, the ECU 50 is electrically connected to the injectors 12, the spark plugs 13, the throttle valve 34, and the valve stop mechanisms 25a and outputs drive control signals to these components based on results of the calculations and the like. In the present embodiment, a set of the injector 12 and the spark plug 13 is provided for one cylinder, so that four sets of the injector 12 and the spark plug 13 are provided in total. However, in FIG. 5, the injectors 12 are shown by one block, and the spark plugs 13 are shown by one block. One valve stop mechanism 25a is provided for each of the S-HLA 25 for the intake side in the first cylinder 2A, the S-HLA 25 for the exhaust side in the first cylinder 2A, the S-HLA 25 for the intake side in the fourth cylinder 2D, and the S-HLA 25 for the exhaust side in the fourth cylinder 2D, so that four valve stop mechanisms 25a are provided in total. However, in FIG. 5, the valve stop mechanisms 25a are shown by one block.

More specific functions of the ECU 50 will be explained. As specific functional elements regarding reduced-cylinder control for realizing the reduced-cylinder operation, the ECU 50 includes an operation request determining portion 51, a valve control portion 52, a valve return determining portion (exhaust valve abnormality determining portion) 53, and a combustion control portion 54.

Based on engine operating conditions (such as a load and the rotating speed) specified from values detected by the accelerator opening degree sensor SN5 and the crank angle sensor SN1, the operation request determining portion 51 determines which of the reduced-cylinder operation and the all-cylinder operation is realized. For example, in a specific operating condition in which the rotating speed and load of the engine are relatively low, the operation request determining portion 51 determines that the reduced-cylinder operation in which the first and fourth cylinders 2A and 2D are stopped (only the second and third cylinders 2B and 2C are operated) is requested. In contrast, in a remaining operating condition other than the specific operating condition, the operation request determining portion 51 determines that the all-cylinder operation in which all the first to fourth cylinders 2A to 2D are operated is requested.

The valve control portion 52 switches operating states (a state where the opening/closing operations can be performed or a state where the opening/closing operations are inhibited, and the valves are kept closed) of the intake and exhaust valves 8 and 9 of the stopped cylinders (first and fourth cylinders) 2A and 2D. Specifically, in the reduced-cylinder operation, the valve control portion 52 drives the solenoid valves 42 such that the hydraulic pressure by which each of the pivot portions 22 of the valve stop mechanisms 25a becomes the unlocked state (see FIG. 3C) is supplied to each of the pivot portions 22. Thus, the valve stop mechanisms 25a restrict the opening/closing operations of the intake and exhaust valves 8 and 9 of the stopped cylinders (first and fourth cylinders) 2A and 2D, and these valves are kept closed. On the other hand, in the all-cylinder operation, the valve control portion 52 drives the solenoid valves 42 such that the hydraulic pressure by which each of the pivot portions 22 of the valve stop mechanisms 25a becomes the locked state (see FIG. 3A) is supplied to each of the pivot portions 22. Thus, the opening/closing operations of the intake and exhaust valves 8 and 9 of the stopped cylinders (first and fourth cylinders) 2A and 2D are allowed.

When the returning from the reduced-cylinder operation to the all-cylinder operation is requested, the valve control portion 52 changes a drive start timing (timing at which the solenoid valve 42 starts changing the hydraulic pressure) of the solenoid valve 42 in accordance with the engine revolution when the returning is requested and the timing when the returning is requested. A procedure for changing the drive start timing of the solenoid valve 42 will be described later.

Based on the intake pressure (value detected by the intake pressure sensor SN4) before and after a timing at which the intake valves 8 of the stopped cylinders (first and fourth cylinders) 2A and 2D starts opening, the valve return determining portion 53 determines whether or not the exhaust valves 9 of the stopped cylinders (first and fourth cylinders) 2A and 2D are normally opened when switching from the reduced-cylinder operation to the all-cylinder operation, that is, whether or not the opening/closing operations of the exhaust valves 9 are returned to a normal state when switching from the reduced-cylinder operation to the all-cylinder operation.

Figure 7:
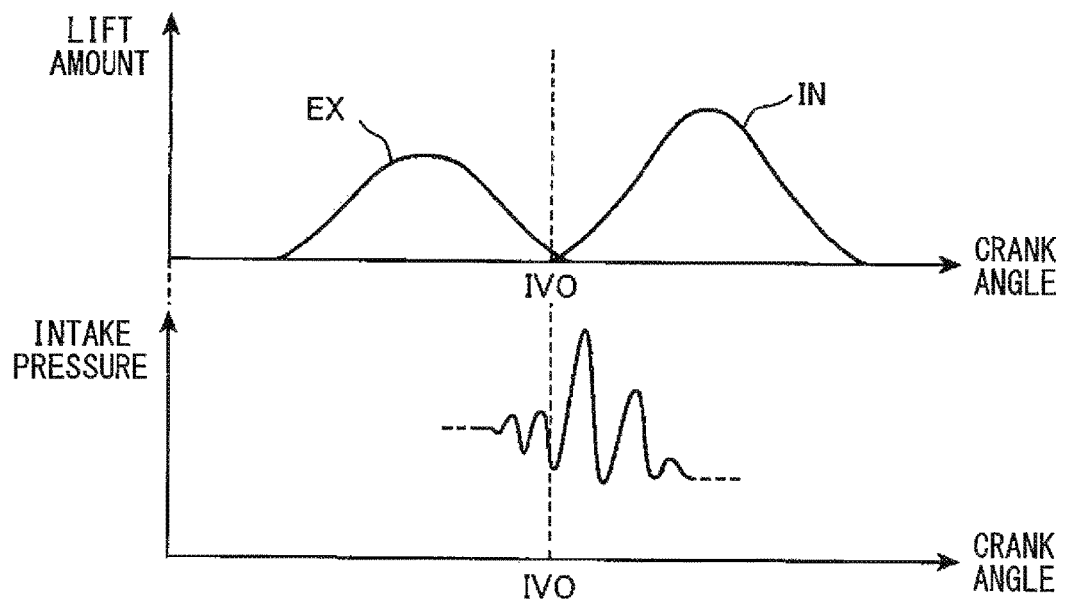
FIG. 7 is a diagram showing a state of intake pressure at an intake valve open start timing.

Specifically, for example, if the valve stop mechanism 25a breaks, and the exhaust valves 9 of the stopped cylinder (first or fourth cylinder) 2A or 2D stop in a closed state, the piston 11 of the stopped cylinder (first or fourth cylinder) 2A or 2D compresses the gas in the cylinder in the exhaust stroke. Therefore, as shown in FIG. 7, when the intake valves 8 start opening (in FIG. 7, this timing is shown by IVO), a phenomenon occurs, in which the compressed gas in the cylinder flows backward through the intake ports 6 to the intake passage 30, and the intake pressure temporarily increases. On the other hand, when the exhaust valves 9 of the stopped cylinders (first and fourth cylinders) 2A and 2D are returned to the normal state, the compression of the gas by the pistons 11 does not occur, so that the intake pressure does not increase so much at the open start timing of the intake valves 8.

By utilizing the above phenomenon, when the intake pressure at the open start timing of the intake valves 8 is low, it can be determined that the exhaust valves 9 are returned to the normal state, and when the intake pressure at the open start timing of the intake valves 8 is high, it can be determined that the exhaust valves 9 are not returned to the normal state. In the present embodiment, the intake pressure based on the value detected by the intake pressure sensor SN4 is examined in a predetermined period including the open start timing of the intake valves 8 of the stopped cylinders, and whether or not the exhaust valves 9 are returned to the normal state is determined based on the intake pressure specified.

Figure 8:
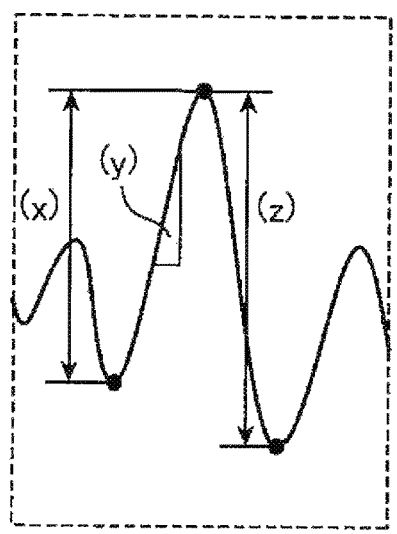
FIG. 8 is a diagram showing parameters used to determine an abnormality of the exhaust valve.

As a specific parameter regarding the intake pressure used for the determination, various state quantities can be adopted. For example, the determination may be performed based on a difference between an absolute value of the intake pressure and a predetermined value or a difference between the absolute value of the intake pressure and the intake pressure in the vicinity of the open start timing of the intake valves 8 of the operating cylinder. Further, various state quantities shown in FIG. 8 can be adopted. To be specific, a difference (shown by x in FIG. 8) between a maximum value of the intake pressure detected in the predetermined period and a pressure value of a valley portion of a pressure waveform which portion appears immediately before the maximum value of the intake pressure may be adopted. Or, a difference (shown by z in FIG. 8) between maximum and minimum values of the intake pressure detected in the predetermined period may be adopted as a pressure fluctuation. Or, an increasing rate (inclination; shown by y in FIG. 8) of the intake pressure which increases toward the maximum value may be adopted as the pressure fluctuation.

At the time of the returning from the reduced-cylinder operation to the all-cylinder operation, based on a timing at which a drive start command is output from the valve control portion 52 to the solenoid valve 42, the valve return determining portion 53 determines whether or not the opening of the intake valves 8 of the stopped cylinder (first or fourth cylinder) 2A or 2D is restarted.

Specifically, when the above command is output in the exhaust valve switching start period Tex, the valve return determining portion 53 determines that the opening of the intake valves 8 is restarted after the opening/closing operations of the exhaust valves 9 of the stopped cylinder (first or fourth cylinder) 2A or 2D. Then, the valve return determining portion 53 waits for the valve open timing of the exhaust valves 9 to pass and performs the above determination regarding the open/close states of the exhaust valves 9 based on the intake pressure before and after the next open start timing of the intake valves 8. Further, when the above command is output in the intake valve switching start period Tin, the valve return determining portion 53 determines that the opening of the intake valves 8 is restarted immediately after the output timing of this command. Then, the valve return determining portion 53 performs the above determination regarding the open/close states of the exhaust valves 9 based on the intake pressure before and after the open start timing of the intake valves 8 immediately after this timing.

In the present embodiment, when the returning from the reduced-cylinder operation to the all-cylinder operation is requested in a predetermined period, the valve return determining portion 53 performs the above determination regarding the open/close states of the exhaust valves 9 based on the intake pressure at the open start timing at which the intake valves 8 open for the first time after the returning to the all-cylinder operation. As described below, in this case, an open command is output to the exhaust valves 9 before the intake valves 8 are open. On the other hand, when the returning from the reduced-cylinder operation to the all-cylinder operation is requested at a timing after the predetermined period, the valve return determining portion 53 performs the above determination regarding the open/close states of the exhaust valves 9 based on the intake pressure at the open start timing at which the intake valves 8 open for the second time after the returning to the all-cylinder operation.

The reason for this is as below.

Figure 9:
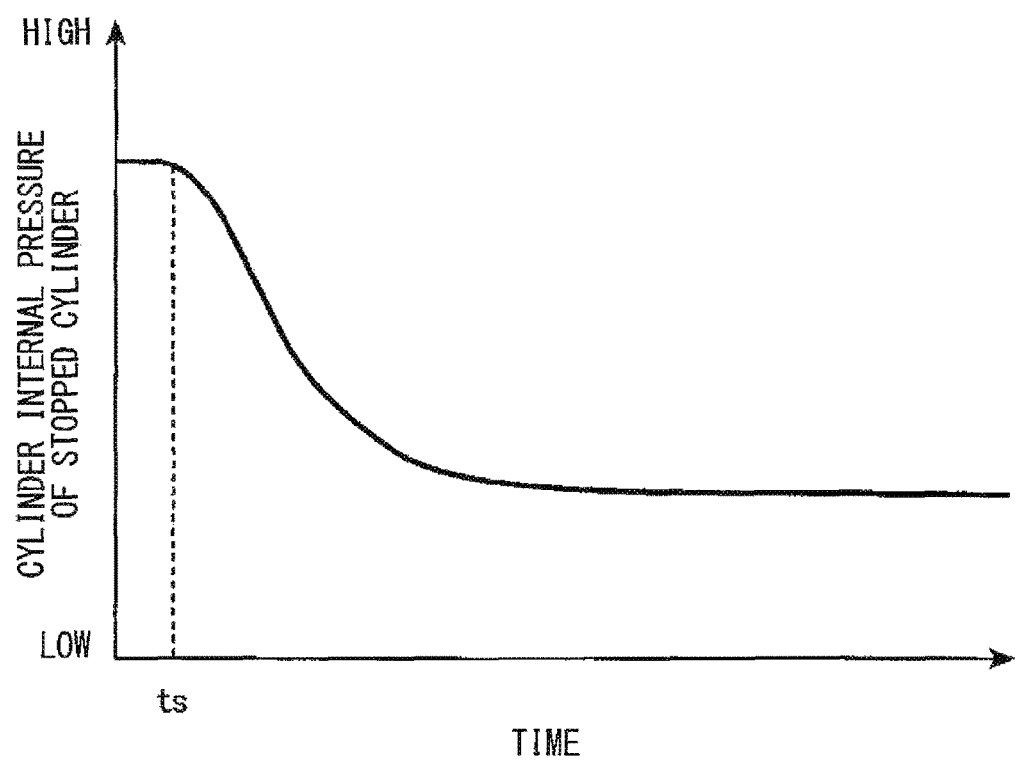
FIG. 9 is a graph showing a change in cylinder internal pressure of a stopped cylinder after a reduced-cylinder operation is started.

FIG. 9 shows a temporal change of the cylinder internal pressure of the stopped cylinder (first or fourth cylinder) 2A or 2D from the start (time ts) of the reduced-cylinder operation. As shown in FIG. 9, during the reduced-cylinder operation of the engine, in the stopped cylinders (first and fourth cylinders) 2A and 2D, the pistons 11 reciprocate with the intake valves 8 and the exhaust valves 9 closed. Therefore, by this reciprocating movement, the gas leaks to an outside through a gap between the piston 11 and an inner wall of the combustion chamber 10, so that the cylinder internal pressure gradually decreases.

In a case in which: the returning from the reduced-cylinder operation to the all-cylinder operation is requested after the cylinder internal pressure decreases; after the returning is requested, the above determination regarding the open/close states of the exhaust valves 9 is performed at the open start timing at which the intake valves 8 open for the first time after the opening (open command) of the exhaust valves 9; and the exhaust valves 9 are not open, the gas pressure flowing backward to the intake passage 30 is low, and the increase or fluctuation in the intake pressure may not be detected. Therefore, in the present embodiment, as described above, when an elapsed time T since the start of the reduced-cylinder operation exceeds a predetermined time TO, the determination of the abnormality of the exhaust valves is performed based on the intake pressure at the open start timing at which the intake valves 8 open for the second or subsequent time. With this, since the intake valves 8 are open once, the intake air is newly introduced to the cylinder. Therefore, when the exhaust valves 9 are not open, the intake air is compressed in the exhaust stroke, and the high intake pressure is detected before and after the open start timing of the intake valve. Thus, the open/close states of the exhaust valves 9 can be properly determined.

On the other hand, when the elapsed time T since the start of the reduced-cylinder operation falls within the predetermined time TO, the cylinder internal pressure of each of the stopped cylinders (first and fourth cylinders) 2A and 2D is kept high. Therefore, it is unnecessary to newly introduce the intake air into the cylinder by opening the intake valves 8. Therefore, in this case, as described above, the above determination regarding the open/close states of the exhaust valves 9 is performed based on the intake pressure at the open start timing at which the intake valves 8 open for the first time after the returning to the all-cylinder operation.

The combustion control portion 54 changes the control of the injectors 12 and spark plugs 13 of the first and fourth cylinders 2A and 2D in accordance with whether the operation of the engine is the reduced-cylinder operation or the all-cylinder operation. To be specific, in the all-cylinder operation, the combustion control portion 54 drives the injectors 12 and spark plugs 13 of all the cylinders 2A to 2D to execute the fuel injection and ignition, thereby combusting the air-fuel mixture in all the cylinders 2A to 2D. On the other hand, in the reduced-cylinder operation, the combustion control portion 54 stops driving the injectors 12 and spark plugs 13 of the stopped cylinders (first and fourth cylinders) 2A and 2D to stop the combustion of the air-fuel mixture in the stopped cylinders (first and fourth cylinders) 2A and 2D.

At the time of switching from the reduced-cylinder operation to the all-cylinder operation, to avoid the occurrence of so-called backfire, the combustion control portion 54 restarts the fuel injection and ignition in the cylinders 2A and 2D after the valve return determining portion 53 confirms that the exhaust valves 9 of the first and fourth cylinders 2A and 2D are returned to the normal state. To be specific, if the fuel injection and ignition are restarted and the combustion is restarted in the stopped cylinder in a state where the exhaust valves 9 are not returned to the normal state (are closed), the high-temperature exhaust gas generated by the combustion may flow backward through the intake passage at the time of the next opening of the intake valves 8. Therefore, the combustion is restarted especially after it is confirmed that the exhaust valves 9 are returned to the normal state.

Figure 11:
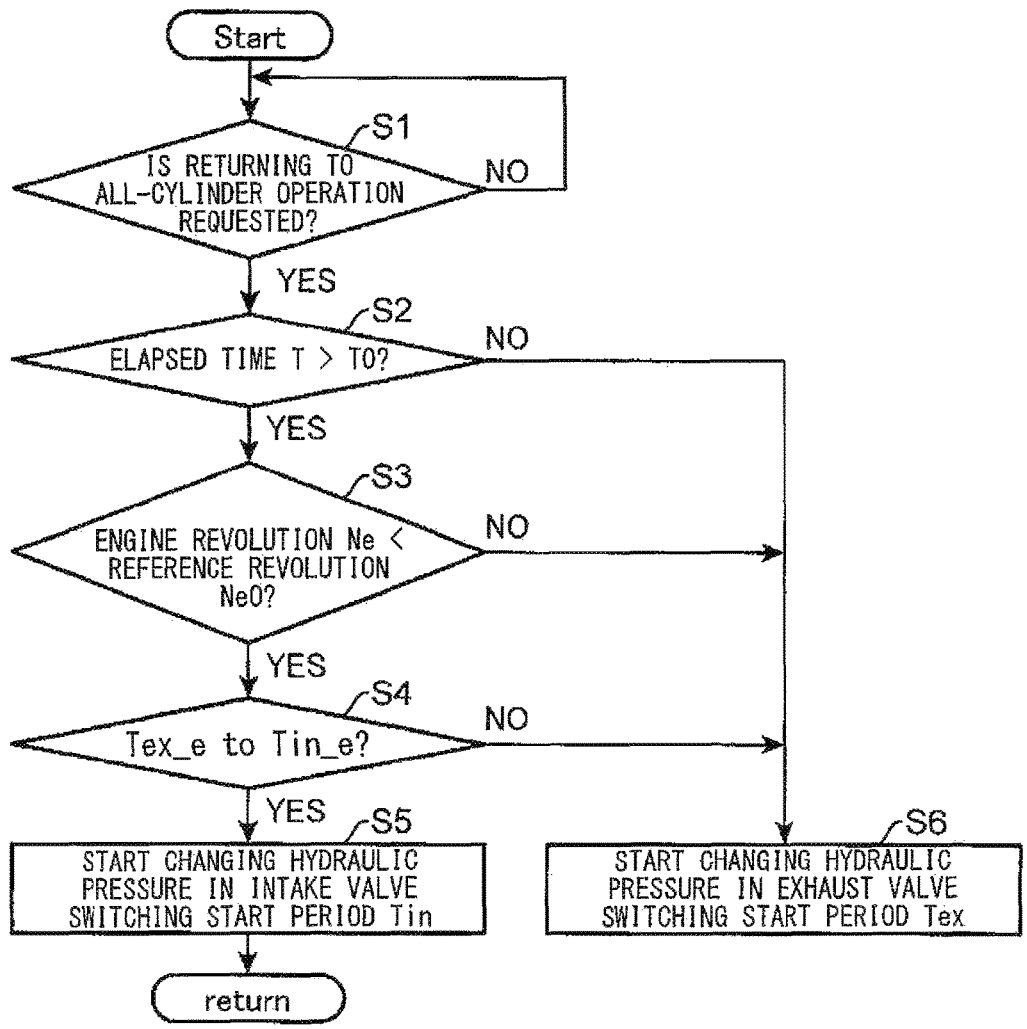
FIG. 11 is a flow chart showing a procedure for changing a drive start timing of a solenoid valve.

(4) Procedure for Changing Drive Start Timing (Hydraulic Pressure Change Start Timing) of Solenoid Valve 42 at the Time of Returning from Reduced-Cylinder Operation to all-Cylinder Operation A procedure performed by the valve control portion 52 for changing the drive start timing of the solenoid valve 42 at the time of the returning from the reduced-cylinder operation to the all-cylinder operation will be explained in reference to the flow chart of FIG. 11.

When the ECU 50, more specifically, the operation request determining portion 51 determines in Step S1 that the returning from the reduced-cylinder operation to the all-cylinder operation is requested, the valve control portion 52 performs Steps S2 to S6 to determine the drive start timing of the solenoid valve 42.

First, the valve control portion 52 determines in Step S2 whether or not the elapsed time T since the start of the reduced-cylinder operation exceeds the predetermined time TO. When the determination is NO, that is, when the elapsed time T since the start of the reduced-cylinder operation falls within the predetermined time TO, the process proceeds to Step S6. In Step S6, the valve control portion 52 drives the solenoid valve 42 in the exhaust valve switching start period Tex and causes the solenoid valve 42 to start changing the hydraulic pressure supplied to the valve stop mechanism 25a. To be specific, the valve control portion 52 first restarts the opening of the exhaust valves 9 of the stopped cylinders (first and fourth cylinders) 2A and 2D and then restarts the opening of the intake valves 8 of the stopped cylinders.

In contrast, when the determination in Step S2 is YES, the process proceeds to Step S3. In Step S3, whether or not a current engine revolution Ne is less than a preset reference revolution Ne0 is determined. When the determination is NO, that is, when the current operating condition is a relatively high rotation which is not less than the reference revolution Ne0, the process proceeds to Step S6, and the valve control portion 52 causes the solenoid valve 42 to start changing the hydraulic pressure in the exhaust valve switching start period Tex. To be specific, the valve control portion 52 first restarts the exhaust valves 9 of the stopped cylinders and then restarts the opening of the intake valves 8 of the stopped cylinders.

In contrast, when the determination in Step S3 is YES, that is, when the current engine revolution Ne is a relatively low rotation which is less than the reference revolution Ne0, the process proceeds to Step S4. In Step S4, the valve control portion 52 determines whether or not a current time that is the timing at which the returning is requested is a timing in a period from the end timing Tex_e of the exhaust valve switching start period Tex until the end timing Tin_e of the intake valve switching start period Tin. When the determination is NO, that is, when the timing at which the returning is requested is the timing in the period from the end timing Tin_e of the intake valve switching start period Tin until the end timing Tex_e of the exhaust valve switching start period Tex, the process proceeds to Step S6. Then, as described above, the valve control portion 52 first restarts the exhaust valves 9 of the stopped cylinders and then restarts the opening of the intake valves 8 of the stopped cylinders. The valve control portion 52 causes the solenoid valve 42 to start changing the hydraulic pressure in the exhaust valve switching start period Tex. To be specific, the valve control portion 52 first restarts the exhaust valves 9 of the stopped cylinders and then restarts the opening of the intake valves 8 of the stopped cylinders.

In contrast, when the determination in Step S4 is YES, that is, when the timing at which the returning is requested falls within the period from the end timing Tex_e of the exhaust valve switching start period Tex until the end timing Tin_e of the intake valve switching start period Tin, the process proceeds to Step S5, and the valve control portion 52 causes the solenoid valve 42 to start changing the hydraulic pressure in the intake valve switching start period Tin. To be specific, the valve control portion 52 first restarts the intake valves 8 of the stopped cylinders and then restarts the opening of the exhaust valves 9 of the stopped cylinders.

As described above, the period from the end timing Tin_e of the intake valve switching start period Tin until the end timing Tex_e of the exhaust valve switching start period Tex is a period including the exhaust valve switching start period Tex and the gray zone immediately before the period Tex. A procedure in which when the timing at which the returning is requested falls within this period including the exhaust valve switching start period Tex and the gray zone immediately before the period Tex, the solenoid valve 42 is caused to start changing the hydraulic pressure in the exhaust valve switching start period Tex, and the opening of the exhaust valves 9 of the stopped cylinders (first and fourth cylinders) 2A and 2D is first restarted denotes a procedure for restarting the opening of the valve which can be opened at an earlier stage. Similarly, the period from the end timing Tex_e of the exhaust valve switching start period Tex until the end timing Tin_e of the intake valve switching start period Tin is a period including the intake valve switching start period Tin and the gray zone immediately before the period Tin. A procedure in which when the timing at which the returning is requested falls within this period including the intake valve switching start period Tin and the gray zone immediately before the period Tin, the solenoid valve 42 is caused to start changing the hydraulic pressure in the intake valve switching start period Tin, and the opening of the intake valves 8 of the stopped cylinders is first restarted denotes a procedure for restarting the opening of the valve which can be opened at an earlier stage.

(5) Actions

As explained above, according to the engine system of the present embodiment, when the engine revolution is not less than the reference revolution Ne0 at the time of the returning from the reduced-cylinder operation to the all-cylinder operation, the opening of the exhaust valves 9 is first restarted regardless of the timing at which the returning is requested.

Therefore, it is possible to more surely avoid a case where: first restarting the opening of the intake valves 8 is failed due to the operation delay of the valve stop mechanism 25a; and although the intake valves 8 are not opened, it is erroneously recognized that the intake valves 8 are opened.

Figure 12:
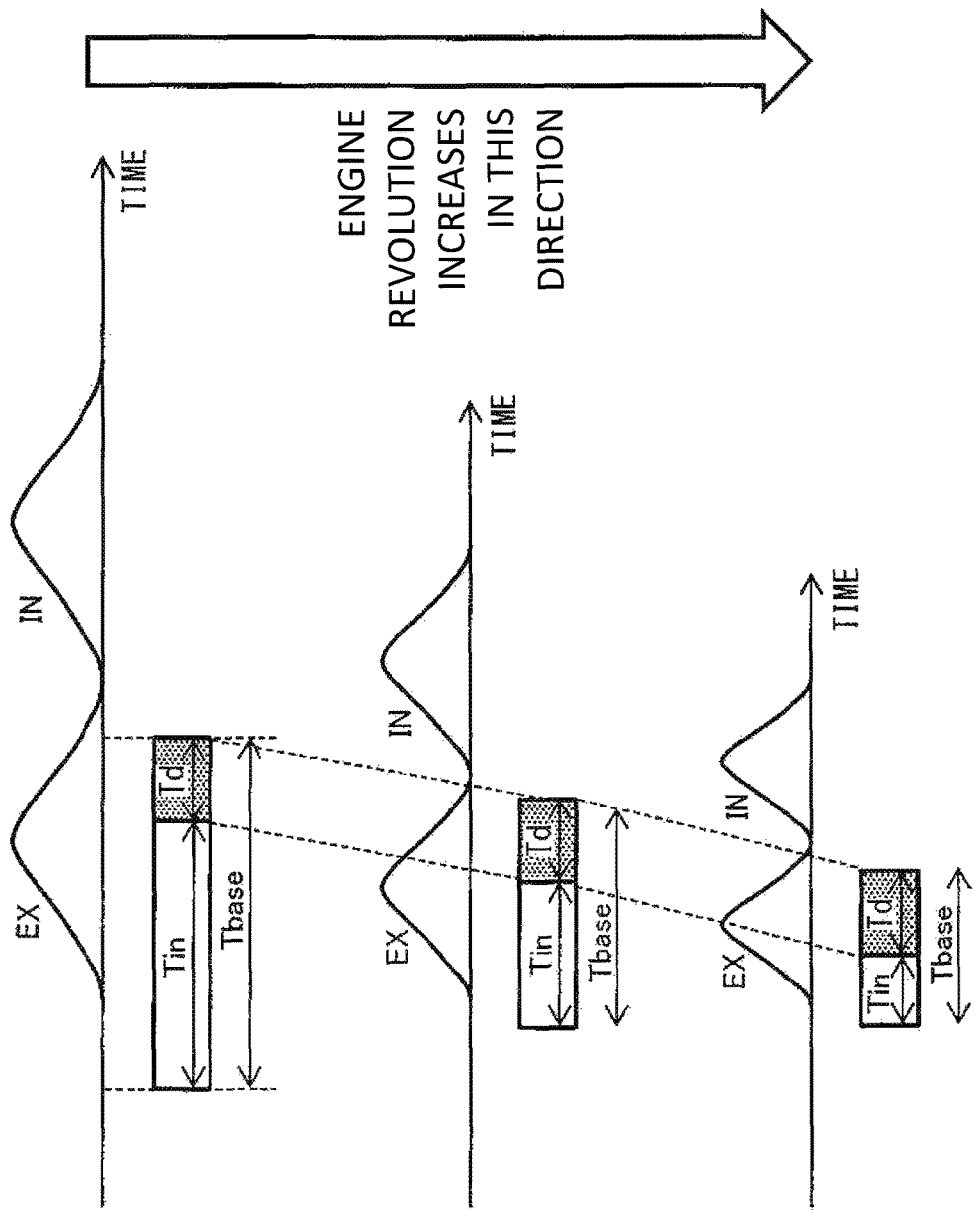
FIG. 12 is a diagram showing a relation between an engine revolution and an intake valve switching start period.

Specific explanations will be made in reference to FIG. 12. FIG. 12 is a diagram showing the engine revolutions different from one another and the intake valve switching start periods Tin corresponding to the respective engine revolutions, and a horizontal axis denotes a time. FIG. 12 shows a case where the engine revolution increases downward. Since a period (period shown by the crank angle) from a closing timing of the exhaust valves 9 until an opening timing of the intake valves 8 is short, a basic period (period that ignores the variation of the operation delay of the valve stop mechanism 25a due to the variations of the property and temperature of the operating oil and the amount of air in the operating oil) Tbase in which the intake valves can be opened without opening the exhaust valves 9 and which is shown by the crank angle is short in the first place. In addition, when the engine revolution increases, a time length per crank angle becomes short. Therefore, the time length of this basic period Tbase becomes extremely short. In contrast, a variation Td of the operation delay of the valve stop mechanism 25a due to the property of the operating oil and the like does not become short even when the engine revolution increases. Therefore, as the engine revolution increases, a period obtained based on the basic period Tbase in consideration of the variation Td, that is, the intake valve switching start period Tin in which the intake valves 8 can be surely opened without opening the exhaust valves 9 becomes short. When the engine revolution exceeds a predetermined revolution, the intake valve switching start period Tin may not be secured. To be specific, when the engine revolution is high, and a predetermined operation delay or more of the hydraulic pressure occurs, it may become impossible to open the intake valves 8 without opening the exhaust valves 9.

In contrast, in the present embodiment, as described above, in a high-rotation region where the engine revolution is not less than the reference revolution Ne0, the opening of the exhaust valves 9 is restarted before the opening of the intake valves 8. Therefore, it is possible to surely avoid a case where although the opening of the intake valves 8 is commanded, the intake valves 8 are not opened due to the above variation and a case where although the intake valves 8 are not opened, it is erroneously recognized that the intake valves 8 are opened.

Further, it is possible to surely avoid a case where since it is erroneously recognized that the intake valves 8 are opened, it is erroneously determined that the exhaust valves 9 are opened. To be specific, as described above, when the phenomenon in which the intake pressure increases occurs, the valve return determining portion 53 configured to determine whether or not the opening/closing operations of the exhaust valves 9 are returned to the normal state determines that the opening/closing operations of the exhaust valves 9 are not returned to the normal state, and when the intake pressure is low, the valve return determining portion 53 determines that the opening/closing operations of the exhaust valves 9 are returned to the normal state. Even when the intake valves 8 are not actually opened, the gas in the cylinder does not flow backward through the intake valves 8 to the intake passage 30, and the intake pressure does not increase. Therefore, when the intake pressure is low since the intake valves 8 are not actually opened, the valve return determining portion 53 may erroneously determines based on this low intake pressure that the opening/closing operations of the exhaust valves 9 are returned to the normal state. However, in the present embodiment, as described above, it is possible to avoid the case where it is erroneously recognized that the intake valves 8 are opened. Therefore, the erroneous determination regarding the exhaust valves 9 can also be surely avoided. Further, it is possible to avoid a case where the backfire occurs by the restart of the combustion due to the erroneous determination that the exhaust valves 9 are returned to the normal state. Thus, the safety can be further improved.

In the present embodiment, when the engine revolution is low, but the time T from when the reduced-cylinder operation is started until when the returning to the all-cylinder operation is requested falls within the predetermined time TO, the opening of the exhaust valves 9 is first restarted regardless of the timing at which the returning is requested. Further, in this case, based on the intake pressure at the open start timing at which the intake valves 8 open for the first time after the returning to the all-cylinder operation, the valve return determining portion 53 determines whether or not the exhaust valves 9 are returned to the normal state.

Therefore, when the time T from when the reduced-cylinder operation is started until when the returning to the all-cylinder operation is requested falls within the predetermined time TO, the determination regarding whether or not the exhaust valves 9 are returned to the normal state can be performed at an early stage while avoiding the erroneous recognition and erroneous determination regarding the open states of the intake valves 8 and the exhaust valves 9 due to the failure of the restart of the opening of the intake valves 8. In addition, the backward flow of the relatively high-pressure gas in the cylinder to the intake side can be avoided. Thus, the safety can be further improved.

Specifically, as described above, at an early stage after the start of the reduced-cylinder operation, the cylinder internal pressure of each of the stopped cylinders (first and fourth cylinders) 2A and 2D is kept high. Therefore, when the opening of the intake valves 8 is first restarted at this early stage, the high-pressure gas in the cylinder may flow backward to the intake side. Further, as described above, at this early stage, it is unnecessary to perform the determination of the abnormality of the exhaust valves 9 after new intake air is introduced to the cylinder by once opening the intake valves 8. Therefore, according to the present embodiment configured as above, the above determination can be properly performed at a relatively early stage while avoiding a case where the high-pressure gas flows backward and a case where the opening of the intake valves 8 is first restarted, which may be failed.

On the other hand, as described above, in a case where the returning to the all-cylinder operation is requested when the predetermined time TO elapses since the start of the reduced-cylinder operation, and whether or not the exhaust valves 9 are returned to the normal state is determined when the opening of the intake valves 8 is first restarted, it may be erroneously determined that the exhaust valves 9 are returned to the normal state. However, according to the present embodiment, in this case, whether or not the exhaust valves 9 are returned to the normal state is determined based on the intake pressure before and after the open start timing at which the intake valves 8 open for the second or subsequent time after the returning. Therefore, the above erroneous determination can be avoided.

(6) Modified Example

Figure 13:
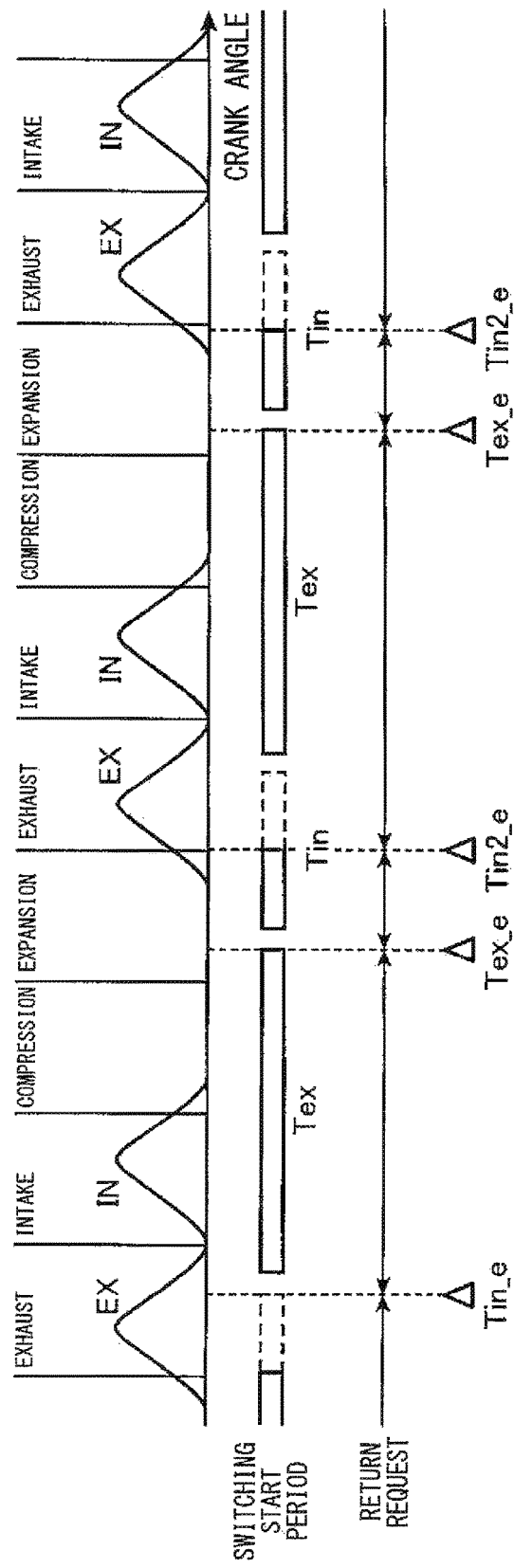
FIG. 13 is a diagram showing a relation between the timing at which the returning is requested and the hydraulic pressure change start timing according to Modified Example of the present invention.

The above embodiment has explained a case where when the engine revolution is less than the reference revolution, and the returning is requested between the end timing Tex_e of the exhaust valve switching start period Tex and the end timing Tin_e of the intake valve switching start period Tin, the solenoid valve 42 is caused to start changing the hydraulic pressure in the intake valve switching start period Tin, and the opening of the intake valves 8 is first restarted. However, to avoid a case where the restart of the opening of the intake valves 8 is failed due to unexpected variations although changing the hydraulic pressure is started in the intake valve switching start period Tin, when the opening of the intake valves 8 is first restarted, the solenoid valve 42 may be caused to start changing the hydraulic pressure at an earlier stage in the intake valve switching start period Tin. For example, as shown in FIG. 13, the opening of the intake valves 8 may be first restarted only when the returning is requested between the end timing Tex_e of the exhaust valve switching start period Tex and a middle timing Tin2_e (a timing in the middle between the start timing Tin_s and the end timing Tin_e of the intake valve switching start period Tin) of the intake valve switching start period Tin. In this case, the solenoid valve 42 is caused to start changing the hydraulic pressure in a first half of the intake valve switching start period Tin. Therefore, even if an unexpected operation delay occurs, it is more surely avoid a case where the restart of the opening of the intake valves 8 is failed.

Further, the above embodiment has explained a case where: immediately after the operating condition is switched to the specific operating condition, the operation request determining portion 51 outputs the request of the returning to the all-cylinder operation; and based on this, the valve control portion 52 immediately determines the drive start timing of the solenoid valve 42 (i.e., the timing at which changing the hydraulic pressure is started). However, a return request signal for determining the drive start timing of the solenoid valve 42 may be output to the valve control portion 52 after a predetermined time from the determination that the operating condition is switched.

LIST OF REFERENCE CHARACTERS

2A to 2D cylinder
8 intake valve
9 exhaust valve
25a valve stop mechanism
42 solenoid valve (hydraulic pressure changing device)
52 valve control portion
53 valve return determining portion (exhaust valve abnormality determining portion)
100 engine system

The invention claimed is:

1. An engine system comprising a plurality of cylinders each including an intake valve and an exhaust valve, an air-fuel mixture that is a mixture of air and a fuel being combusted in each of the plurality of cylinders,
the engine system configured to switch between an all-cylinder operation in which the air-fuel mixture is combusted in each of all the cylinders and a reduced-cylinder operation in which the air-fuel mixture is not combusted in a specific cylinder out of the plurality of cylinders, and the specific cylinder is set to a stop state,
the engine system further comprising:
a valve drive mechanism, including a camshaft with cam portions, configured to open and close the intake and exhaust valves of the cylinders at respective predetermined timings;
a hydraulic drive valve stop mechanism, including lock pins, configured to perform switching between a state where each of the intake valve and exhaust valve of the specific cylinder is openable and closable at the predetermined timing by the valve drive mechanism and a state where each of the intake valve and exhaust valve of the specific cylinder is kept closed;
a solenoid valve configured to change hydraulic pressure supplied to the valve stop mechanism; and
a processor configured to:
cause the valve stop mechanism to perform the switching by causing the solenoid valve to change the hydraulic pressure; and
when returning from the reduced-cylinder operation to the all-cylinder operation is requested, determine based on intake pressure before and after an open start timing of the intake valve of the specific cylinder whether or not opening/closing operations of the exhaust valve of the specific cylinder are normally performed, wherein:
the valve stop mechanism is configured to simultaneously switch the states of the intake valve and exhaust valve of the specific cylinder according to a first period and a second period, the first period being a switching start period in which the exhaust valve opens before the intake valve when the solenoid valve starts changing the hydraulic pressure, the second period being a switching start period in which the intake valve opens before the exhaust valve when the solenoid valve starts changing the hydraulic pressure, and the switching being from the state where the intake valve and the exhaust valve are kept closed to the state where the intake valve and the exhaust valve are openable and closable at the predetermined timings by the valve drive mechanism;

when switching from the all-cylinder operation to the reduced-cylinder operation is requested, the processor causes the solenoid valve to change the hydraulic pressure such that the switching to the state where the intake valve and exhaust valve of the specific cylinder are kept closed is performed by the valve stop mechanism;

when the returning from the reduced-cylinder operation to the all-cylinder operation is requested, the processor causes the solenoid valve to change the hydraulic pressure such that the switching to the state where the intake valve and exhaust valve of the specific cylinder are openable and closable is performed by the valve stop mechanism;

when the returning is requested in a period from an end timing of the second period until an end timing of the first period, and an engine revolution rate is less than a preset reference revolution rate, the processor causes the solenoid valve to start changing the hydraulic pressure in the first period;

when the returning is requested in a period from the end timing of the first period until the end timing of the second period, and the engine revolution rate is less than the reference revolution rate, the processor causes the solenoid valve to start changing the hydraulic pressure in the second period;

when the returning is requested, and the engine revolution rate is not less than the reference revolution rate, the processor causes the solenoid valve to start changing the hydraulic pressure in the first period regardless of a timing at which the returning is requested.

2. The engine system according to claim 1, wherein:

only when the engine revolution rate is less than the reference revolution rate, and the returning from the reduced-cylinder operation to the all-cylinder operation is requested in a period from the end timing of the second period until a middle timing of the first period, the processor causes the solenoid valve to start changing the hydraulic pressure in the first period; and when the engine revolution rate is less than the reference revolution rate, and the returning is requested in a period other than the period from the end timing of the second period until the middle timing of the first period, the processor causes the solenoid valve to start changing the hydraulic pressure in the second period.

3. The engine system according to claim 1, wherein the processor performs the determination based on the intake pressure before and after the open start timing at which the intake valve of the specific cylinder opens for a second or subsequent time after the returning from the reduced-cylinder operation to the all-cylinder operation is requested.

4. The engine system according to claim 1, wherein when the engine revolution rate is less than the reference revolution rate, but the returning is requested within a predetermined period, the processor causes the solenoid valve to change the hydraulic pressure such that the opening of the exhaust valve of the specific cylinder is restarted before the opening of the intake valve of the specific cylinder.

5. The engine system according to claim 4, wherein:

when the returning from the reduced-cylinder operation to the all-cylinder operation is requested within a predetermined period from a start of the reduced-cylinder operation, the processor performs the determination based on the intake pressure before and after the open start timing at which the intake valve of the specific cylinder opens for a first or subsequent time after the returning is requested; and when the returning is requested after the predetermined period from the start of the reduced-cylinder operation, the processor performs the determination based on the intake pressure before and after the open start timing at which the intake valve of the specific cylinder opens for a second or subsequent time after the returning is requested.

* * * * *